United States Patent
Hoh et al.

(10) Patent No.: US 9,600,780 B2
(45) Date of Patent: Mar. 21, 2017

(54) METHOD AND APPARATUS FOR SHARING AND MANAGING RESOURCE AVAILABILITY

(75) Inventors: Baik Hoh, San Jose, CA (US); Kenneth Tracton, Palo Alto, CA (US); Yan Tingxin, Amherst, MA (US); Ganesan Deepak, Northampton, MA (US); Juong-Sik Lee, San Jose, CA (US)

(73) Assignee: Nokia Technologies Oy, Espoo (FI)

( * ) Notice: Subject to any disclaimer, the term of this patent is extended or adjusted under 35 U.S.C. 154(b) by 43 days.

(21) Appl. No.: 13/435,460

(22) Filed: Mar. 30, 2012

(65) Prior Publication Data

US 2012/0265874 A1    Oct. 18, 2012

Related U.S. Application Data

(63) Continuation-in-part of application No. 12/955,877, filed on Nov. 29, 2010, now abandoned.

(51) Int. Cl.
G06Q 10/10  (2012.01)
G06Q 10/02  (2012.01)

(52) U.S. Cl.
CPC ............ *G06Q 10/02* (2013.01); *G06Q 10/101* (2013.01); *G06Q 10/109* (2013.01)

(58) Field of Classification Search
CPC ............. G06Q 10/02; G06Q 10/06313; G06Q 10/101; G06Q 10/109
See application file for complete search history.

(56) References Cited

U.S. PATENT DOCUMENTS

| | | | |
|---|---|---|---|
| 6,266,609 B1 | 7/2001 | Fastenrath | |
| 7,516,010 B1* | 4/2009 | Kaplan | G01C 21/30 340/932.2 |
| 2002/0171562 A1 | 11/2002 | Muraki | |
| 2003/0162536 A1* | 8/2003 | Panico | 455/422 |
| 2006/0170566 A1* | 8/2006 | Slemmer et al. | 340/932.2 |
| 2006/0250278 A1* | 11/2006 | Tillotson et al. | 340/932.2 |
| 2007/0008181 A1* | 1/2007 | Rollert et al. | 340/932.2 |
| 2009/0261988 A1 | 10/2009 | Ramirez Serrano | |
| 2010/0302067 A1 | 12/2010 | Goldman et al. | |
| 2010/0302068 A1* | 12/2010 | Bandukwala | 340/932.2 |
| 2012/0265874 A1 | 10/2012 | Hoh et al. | |

FOREIGN PATENT DOCUMENTS

WO     WO 2008/061540 A1    5/2008

OTHER PUBLICATIONS

Office Action for U.S. Appl. No. 12/955,877 dated Dec. 21, 2012, pp. 1-37.

(Continued)

*Primary Examiner* — Andrew Lai
*Assistant Examiner* — M Mostazir Rahman
(74) *Attorney, Agent, or Firm* — Ditthavong & Steiner, P.C.

(57) ABSTRACT

An example approach is provided for sharing and managing resource availability information. One or more resource availability information is received. Further, one or more requests to access the one or more resource availability messages are received from at least one consuming device. Access to the one or more resource availability messages is reserved based, at least in part, on the one or more requests.

19 Claims, 19 Drawing Sheets

(56) References Cited

OTHER PUBLICATIONS

International Search Report and Written Opinion for PCT Application No. PCT/FI2011/050960 dated Feb. 27, 2012, pp. 1-13.
Yan, T., et al., Demo Abstract: mCrowd—A Platform for Mobile Crowdsourcing, Proceedings of the 7th International Conference on Embedded Networked Sensor Systems, SenSys 2009, Berkeley, California, United States, Nov. 4-6, 2009, pp. 347-348.

* cited by examiner

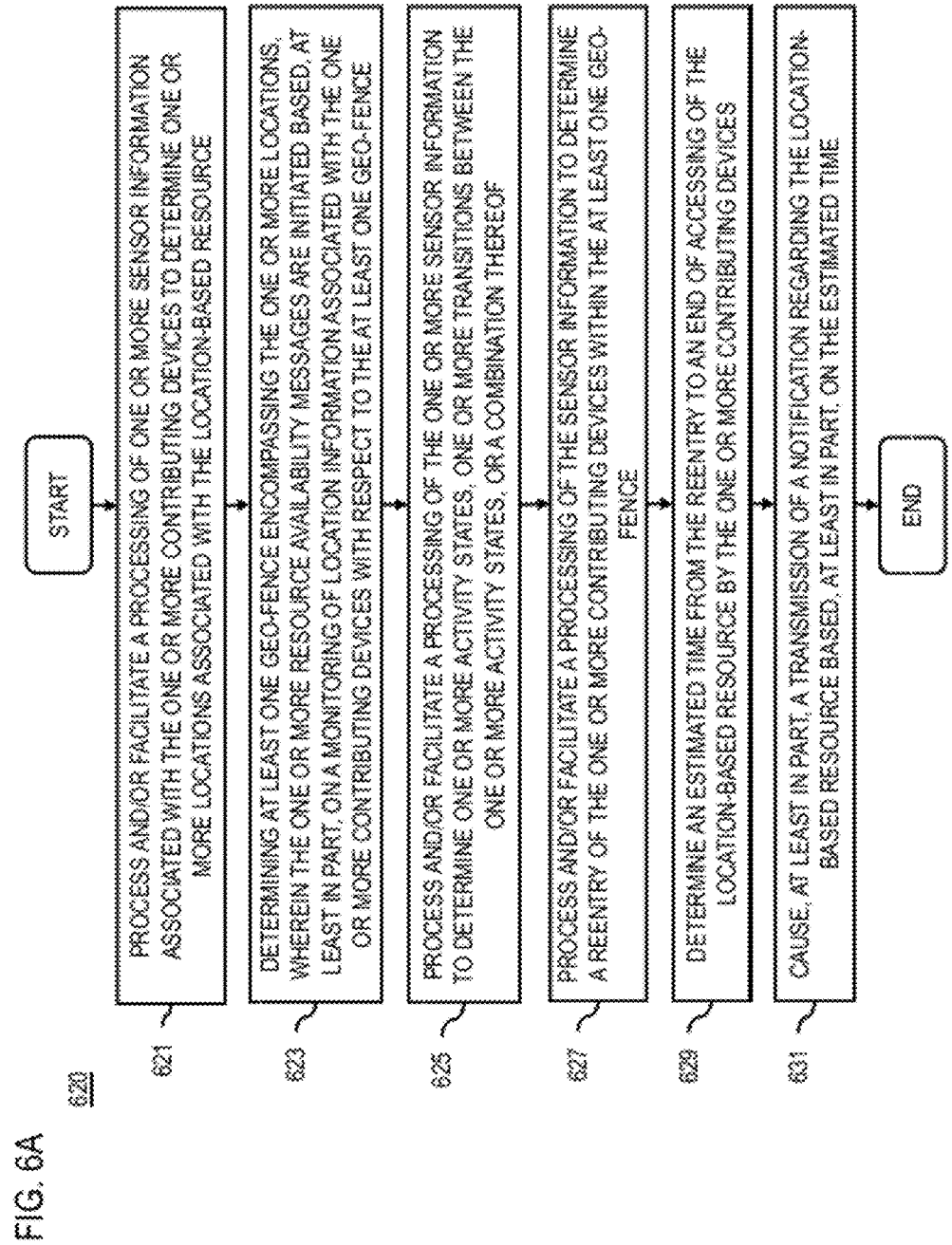

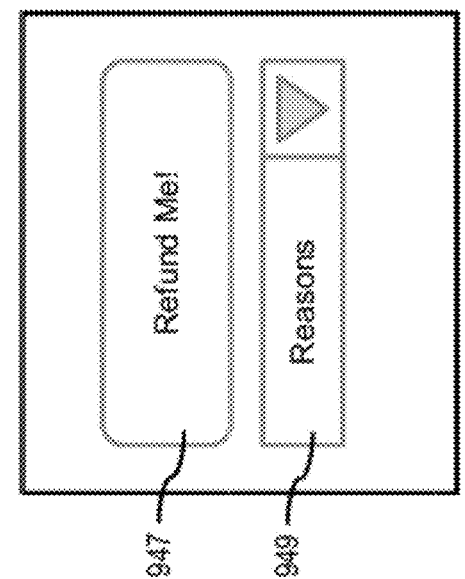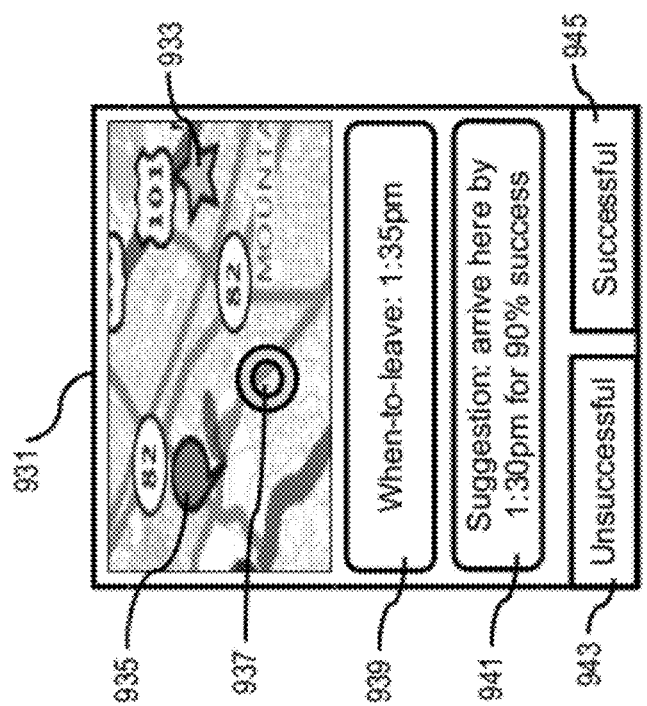
FIG. 9B

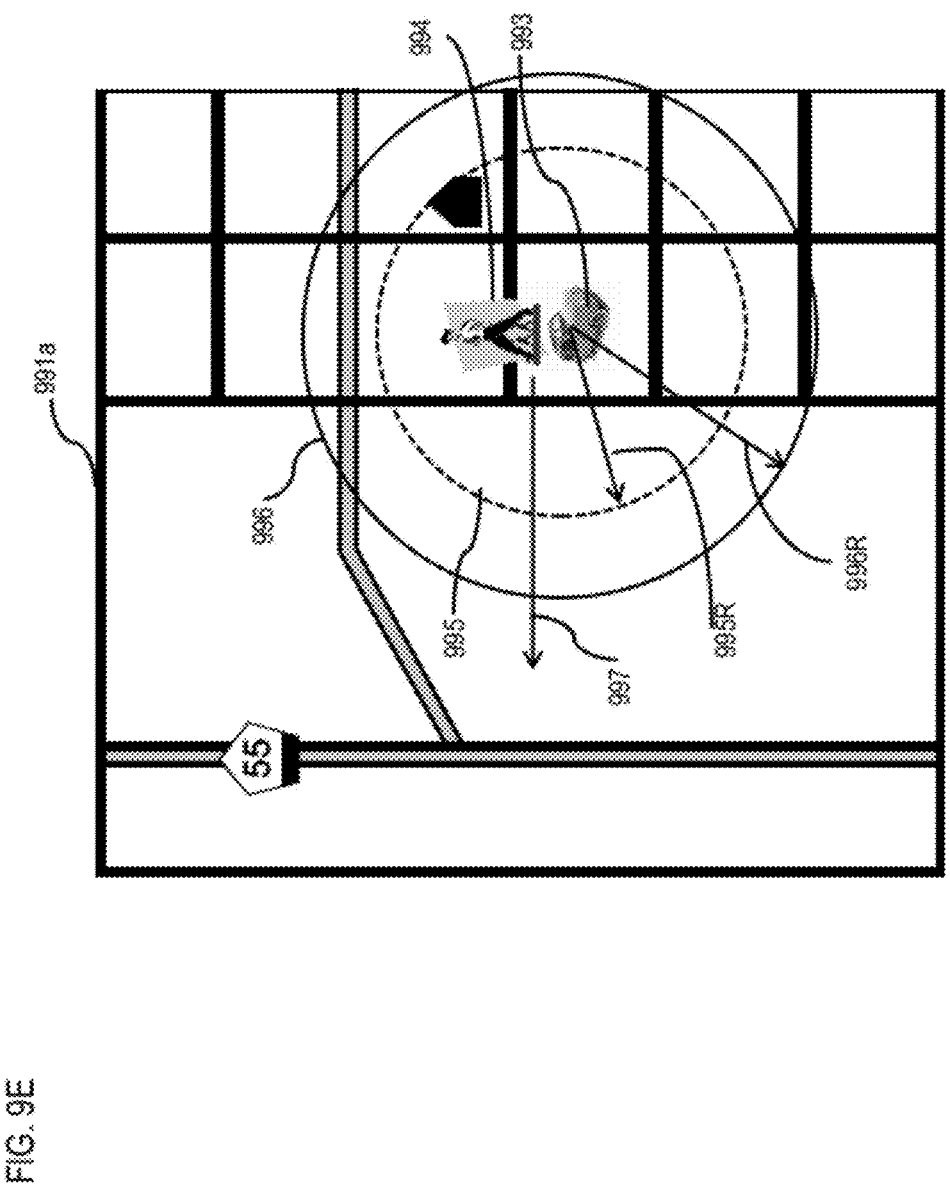

METHOD AND APPARATUS FOR SHARING AND MANAGING RESOURCE AVAILABILITY

RELATED APPLICATION

This application is a continuation-in-part of prior application Ser. No. 12/955,877, filed Nov. 29, 2010, which is herein incorporated by reference in its entirety.

BACKGROUND

Service providers (e.g., wireless and cellular services) and device manufacturers are continually challenged to deliver value and convenience to consumers by, for example, providing compelling network services and advancing the underlying technologies. One area of interest has been the development of services and technologies where users/consumers could share information related to availability of one or more resources. Generally, there are users who know of availability of the resources (e.g., vehicle parking spaces, picnic spaces at a park, sport activity courts, etc.) and would like to share this information with other users and/or with service providers. Accordingly, service providers and device manufacturers face significant technical challenges to enabling the exchange of information regarding availability of resources.

SOME EXAMPLE EMBODIMENTS

Therefore, there is a need for an approach for sharing, managing, and providing resource availability information from and to users.

According to one embodiment, a method comprises receiving one or more resource availability messages from one or more contributing devices. The method also comprises receiving one or more requests to access the one or more resource availability messages from at least one consuming device. The method additionally comprises determining to reserve access to the one or more resource availability messages based, at least in part, on the one or more requests.

According to another embodiment, an apparatus comprising at least one processor, and at least one memory including computer program code for one or more programs, the at least one memory and the computer program code configured to, with the at least one processor, cause the apparatus to receive one or more resource availability messages from one or more contributing devices. The apparatus is additionally caused to, at least in part, receive one or more requests to access the one or more resource availability messages from at least one consuming device. The apparatus is further caused to, at least in part, determine to reserve access to the one or more resource availability messages based, at least in part, on the one or more requests.

According to another embodiment, a computer-readable storage medium carrying one or more sequences of one or more instructions which, when executed by one or more processors, cause, at least in part, an apparatus to receive one or more resource availability messages from one or more contributing devices. The apparatus is additionally causes to, at least in part, receive one or more requests to access the one or more resource availability messages from at least one consuming device. The apparatus is further caused to, at least in part, determine to reserve access to the one or more resource availability messages based, at least in part, on the one or more requests.

According to another embodiment, an apparatus comprises means for receiving one or more resource availability messages from one or more contributing devices. The apparatus also comprises means for causing, at least in part, receiving one or more requests to access the one or more resource availability messages from at least one consuming device. The apparatus further comprises means for causing, at least in part, determining to reserve access to the one or more resource availability messages based, at least in part, on the one or more requests.

According to another embodiment, a method comprises facilitating a processing of and/or processing (1) data and/or (2) information and/or (3) at least one signal; the (1) data and/or (2) information and/or (3) at least one signal based at least in part on one or more resource availability messages from one or more contributing devices and/or one or more requests to access the one or more resource availability messages from at least one consuming device. The method also comprises at least one determination to reserve access to the one or more resource availability messages based, at least in part, on the one or more requests.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6A is a flowchart of a process for automatically detecting, determining and reporting on utilization and/or availability of a location-based resource, according to an embodiment;

FIGS. 9A-9D are diagrams of user interfaces utilized in the processes of FIGS. 4-7, according to various embodiments;

FIGS. 9E-9F are diagrams depicting graphical representations of geo-fences associated with a location-based resource, according to various embodiments;

DESCRIPTION OF SOME EMBODIMENTS

Figure 1:
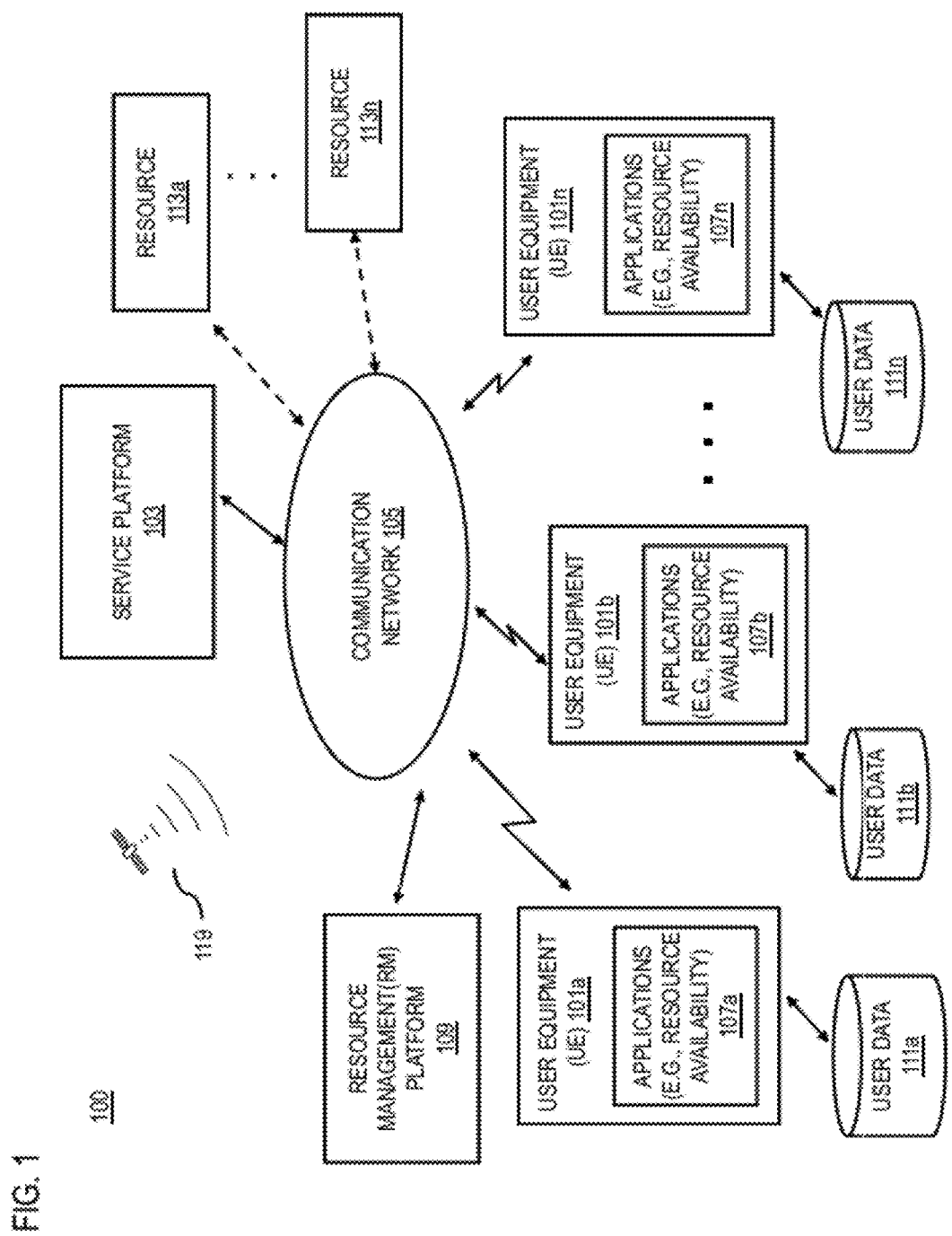
FIG. 1 is a diagram of a system capable of sharing and managing resource availability information, according to an embodiment.

Examples of a method, apparatus, and computer program for sharing and managing resource availability information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As certain resources are in high demand and/or are difficult to locate, one or more users can share availability and other information about one or more resources. In one embodiment of the approach described herein, crowdsourcing (in a community) can be used by one or more users to share such resource availability information with one or more other users and/or with a central management platform which can manage, organize and share the information with the users. As used herein, crowdsourcing refers generally to the process of submitting information, problems, queries, etc. to a community of users and the receiving responses, solutions, etc. based on the collective information of the community. Sharing of such information can have many benefits, for example, reduced time and effort for the users to locate the one or more resources, less environment impact (e.g., reduced pollution, smog, traffic, etc.), improved user experience, positive economic impact, and/or the like.

To facilitate sharing of such information, a resource management platform (as described in more detail below) may be utilized, for instance, to coordinate the sharing of the information among one or more users who report and/or request resource availability information. More specifically, one or more of the participating users may report resource availability information and/or request resource availability information. Further, the resource management platform will receive the resource availability information, receive requests for resource availability information, coordinate, manage and share the information with the users.

By way of example, potential resources that can be managed by the resource management platform are parking spots or spaces. Generally, a parking space in a crowded urban area is a precious resource that impacts driver stress levels, daily productivity, and the environment. Further, the difference between supply and demand for parking spaces can cause a spectrum of environmental, health and safety issues where drivers keep vehicles on the road in the process of circling (usually slowly) the areas where they want to locate a parking space, which can lead to lengthy queues of vehicles that can block several streets. In addition, increased acceleration, deceleration, and braking behavior while circling an area can significantly impact automobile emissions. Moreover, parking issues also adds to driver stress levels which may lead to increased driver frustration, road rage, and accidents. Therefore, a reservation system that would enable a user/driver to buy/reserve a parking space near/at an intended destination prior to leaving user's current location and before arriving at the intended destination could significantly ease the user's concerns with locating a parking space when arriving at the intended destination. In one example, a contributing (CT) user (e.g., a seller) can generate and/or transmit a resource availability message to the resource management platform and/or any number of the other users. Further, the CT user may use a contributing device to communicate with the central management platform (CMP), one or more other user devices, a service provider, a communication network, and the like. Furthermore, a contributing device may communicate substantially automatically and/or independently (e.g., with and/or without user participation) with the central management platform, another user device, a service provider, a communication network and the like. In one embodiment, the resource availability message can, at least, include information on a location of the parking space, identification (ID) information about the CT user's vehicle associated with the parking space, and an estimated time as to when the parking space will become available. In one embodiment, a CT user device can execute a client application (e.g., HTML based) to identify the parking location, for example, by capturing GPS coordinates, identifying the location (e.g., on a mapping application, in combination with information from a device at the parking location, etc.). Additionally, the ID of the CT user vehicle can, at least, complement possible inaccuracy of GPS information, for example, where a GPS signal may be weak or difficult to obtain (e.g., in a downtown full of high rise buildings, in a garage structure, etc.). Further, we can use indoor positioning system based on, for example, Wi-Fi, RFID, and the like technologies. Furthermore, one or more other IDs (e.g., license plate, vehicle make, color, etc.) may be used to assist the consumer (CS) (e.g., a buyer) user in locating the parking space. Moreover, the CS user may use a consuming device to communicate with the central management platform, one or more other user devices, a service provider, a communication network, and the like. Furthermore, a consuming device may communicate substantially automatically and/or independently (e.g., with and/or without user participation) with the central management platform, another user device, a service provider, a communication network and the like.

FIG. 1 is a diagram of a system capable of sharing and managing resource availability information, according to an embodiment. As noted above, one or more users can provide resource availability information to one or more service providers and/or one or more resource management platforms. Further, one or more users can request resource availability information from one or more service providers and/or one or more resource management platforms. The users can be referred to, at least in part, as CT users and as CS users. For example, a CT user generally is utilizing one or more resources, which the CT user intends to release, and wishes to share the resource availability information. A CS user generally is seeking one or more resources, for which, the user wishes to obtain availability information that substantially match criteria of the required one or more resources. A resource management (RM) platform 109 can manage the resource availability information and, for example, can provide incentives (e.g., virtual points, online points, game points, monetary value points, etc.) for the CT user to provide/report information on the resource which the CT user is currently utilizing, which may be released or will be released in the near future. Further, the RM platform 109 can offer the information to one or more CS users. Furthermore, a CT and/or a CS user may trade one or more resource availability information for resource availability information associated with one or more other resources.

In some embodiments, the resource availability information is made available in exchange for, for example, virtual points, game points, monetary value points, and/or the like. In one scenario, the RM platform 109 rewards a CT user when the CT user generates and/or reports a resource availability message. In one embodiment (e.g., in the example with respect to parking spaces), the resource availability message is referred to as a "when-to-leave" (WTL) message which specifies a particular resource or resources (e.g., parking spaces) and when those resources will be available (e.g., when the CT user will leave or vacate the occupied resource). For example, the rewards provided by the RM platform 109 may include any form of reward. In one embodiment, one or more points (e.g., D points) are awarded once the message is received at the RM platform 109, and additional one or more (e.g., S) points are awarded once the message is sold or made available to a CS user. This example approach can lead the CS user to successfully find and utilize a parking space and report the successful utilization. It is noted that although various embodiments are discussed with respect to parking space resources, it is contemplated that the various embodiments of the approach described herein are applicable to any resource that can be exchanged or transferred among users (e.g., personal spaces, sports courts, seating space at a bar, seating space at a sports stadium, seating space at a concert, etc.).

In certain embodiments, a resource includes one or more resources, such as location-based resources, that are limited in availability, may or may not require previous reservation, are available for a limited time, and/or are in demand by one or more users. Furthermore, the location resources include geographic location-based resources such as a vehicle parking space (e.g., for an automobile, a watercraft, a motorcycle, etc.), a personal space (e.g., a pick-nick site at a park, a beach spot, a sporting court, etc.). Moreover, the location resources include resources at an establishment (e.g., at a library, at a bar, at a sports arena, at a sports complex, at a sports park, etc.) located indoor and/or outdoor, reserved and/or not-reserved, and the like. Furthermore, the limited availability of the resources can be due to one or more factors. One such factor may be the total quantity of the resources of the sort (e.g., there may be a certain number of vehicle parking spaces available at a parking lot). Another factor may include the availability of the resources at a particular time and/or location (e.g., a limited quantity of parking spaces or sports courts may be available at a particular location at a certain time). In many instances, one or more available resources may be consumed/utilized by one or more users in a relatively short amount of time.

In one scenario, as previously discussed, a user is utilizing a location-based resource and will be releasing that resource within a short amount of time (e.g., the resource will become available) and the user can share that information with one or more other users and/or with a central resource management platform 109. For example, a user has a vehicle parked at a parking space, which the user intends to release within a short amount of time. The user shares the information related to the parking space such as, at least, the parking space location, time the parking space will become available and/or other information related to the parking space. The CT user can include "when to leave, WTL" time in the resource information shared with the resource management platform. The WTL can indicate, at least in part, an estimated time at which the CT user intends to release the resource (e.g., a parking space). The WTL can assist the RM platform 109 in sharing and managing the information with one or more CS users.

In certain scenarios, it is more likely that a user may have a greater chance to acquire a resource which the user is interested in if the user has access to the resource availability information when compared to a user without access to such information. For example, a user may be seeking a vehicle parking space near a beach on a busy day. The user can request parking space availability information, near the user location and/or near a known location, from a RM platform 109. Further, with the resource availability information, the user has a better chance of locating and obtaining the parking space before other users do. Moreover, a resource (e.g., a parking space) can be in an isolated location and difficult to find quickly, but with the resource location information a user can locate the resource quickly. For example, a parking space may be in a parking garage structure near a shopping center and isolated, but with resource availability information a user can quickly find the parking space. In another example, a pick-nick site may be available near a lake; however with many users seeking a pick-nick site, a user with resource availability information regarding the pick-nick site can potentially locate and access the site before other users do.

Further, in various embodiments, a contributing (CT) device, a consuming (CS) device and/or the RM 109 may substantially automatically communicate with each other for sending and receiving required information items in order to reduce efforts and involvement of a CT and/or a CS user in a crowd-sourced parking system. More specifically, one or more client applications and/or algorithms (e.g., a crowd parking application) may be executed (e.g., in foreground or background) on a device (e.g., a CT device, a CS device, etc.) to automatically detect a change of an event associated with a movement of a user and the device, with accessing of a location-based resource, and provide associated information and reports to the RM platform 109. In one embodiment, a client application consists of two views, a CT user (e.g., seller) view and a CS user (e.g., buyer) view where the CT user view may contain various modules such as a reservation module, a verification module (e.g., ActCheck), and the like. The reservation module may allow a CT user to submit messages for sale and reward to the CT user according to the reservation results. In one embodiment, a WTL message lifetime may be tagged with one or more information items indicating state of the WTL message such as CREATED, SOLD, EXPIRED, PARKED, CONFIRMED, and LOST, where LOST could indicate that the parking space was is taken/consumed by another driver (e.g., a hidden driver.) The verification module may utilize an activity-recognition technique (e.g., algorithms, sensors, accelerometer, etc.) on the user device (e.g., a mobile phone) to detect if activities performed by the CT user, is consistent with one or more expected activities. For example, a CT user may be expected to be walking between a WTL message submission and a leaving time and be within a moving vehicle after the leaving time. Furthermore, the verification module may request and/or receive an additional message from the CT user to indicate "Leaving Now" (LN) message that informs the system that the CT user is leaving at a particular time. Although the leaving time can be inferred from the activity, an LN message can provide more explicit and accurate information to the system. System 100 of FIG. 1 introduces the capability of sharing, managing, and coordinating resource availability information among one or more users. In one embodiment, user equipment (UEs) 101a-101n (also collectively known as UEs 101) may be utilized to share and access resource availability information via a resource management (RM) platform 109 (e.g., a central management platform) over a communication network 105. In certain embodiments, RM platform 109 (e.g., a computing device) may be utilized to manage resources 113a-113n (also collectively known as resources 113), coordinate and facilitate communications between UEs 101 and/or with resources 113 for sharing/reporting and acquiring of resource availability information (e.g., location of a resource, availability time, etc.). In one embodiment, the RM platform 109 may be deployed and/or operated on one or more UEs 101.

Further, the resources 113 can communicate with one or more other resources 113, UEs 101, service platform 103, one or more components of communication network 105. Users may execute one or more applications 107a-107n (e.g., a mapping application, client application, a messaging application, a resource acquisition application, a resource availability information sharing application, etc.) on the UEs 101 to access the resource management platform 109 as well as other platforms such as service platform 103 that may be accessible via the communication network 105. The service platform 103 can provide one or more services (e.g., location based services, mapping information, social networking services, etc.) to one or more users. Further, in certain embodiments, the UEs 101 may be utilized to communicate, via the communication network 105, with RM platform 109 to share and/or acquire resource availability information. In other embodiments, other devices (e.g., a navigation device, a navigation device of a vehicle, etc.) may be utilized to share and/or acquire the resource availability information. Although various embodiments are described with respect to location resources, it is contemplated that the approach described herein may be used with other types of resources.

As noted above, in certain embodiments, the UE 101 includes a resource availability sharing and acquisition application 107. Although various embodiments are described with respect to the resource availability application 107, it is contemplated that the approaches described herein may be performed (or partially performed) by other applications (e.g., location based services, mapping, social networking, etc.). The application 107 may be, in certain scenarios, a program that utilizes an application programming interface (API) to utilize one or more services of the resource management platform 109 and/or service platform 103. The resource availability application 107 may further be a widget that can be installed and executed in a web page or a web runtime engine or a native program. Widgets are light-weight applications, and provide a convenient means for rendering information and accessing services.

In one embodiment, the resource availability application 107 enables the user to initiate resource availability information sharing and/or request (e.g., to share the location of an available parking space, request for information on one or more available parking spaces). The resource availability application 107 can send a message to the RM platform 109 identifying one or more resources that the user wishes to identify as available and/or that the user wishes to access. This information may be associated with resources 113a-113n. Then, information about the one or more resources can be reported to the RM platform 109, service platform 103 and/or to one or more other users. Further, the user may provide resource information that may be utilized to specify the resource the user desires. It is noted that although some of the example embodiments refer to a vehicle parking space, a resource can be any resource, for example, a sports court, a seat at a bar, a seat at a sports stadium, a picnic space, a seating space at a beach, and the like.

In another embodiment, the RM platform 109 returns, at least, a list of nearby WTL messages within certain range specified by the CS user. Each list item is a WTL message overview which includes information, such as location and hourly parking rate. In embodiments where the resource is another type of resource other than parking spaces, the resource availability message (e.g., the WTL message) may specify one or more characteristics of the resource (e.g., the capacity of a picnic table, available amenities, etc.). However, the one or more WTL information are not disclosed to CS users until the CS user commits and requests to purchase the information. In another scenario, the RM platform 109 may show one or more WTL information based, at least, on or more criteria. For example, one or more WTL messages can be listed/sorted by amount of time from current timestamp.

In another embodiment, a CS user accepts to purchase or otherwise retrieve one or more WTL messages. If a CS user purchases a WTL message, one or more (e.g., N) points are deducted from the CS user account and deposited with the RM platform 109. The N points will then be used to reward the CT user for the one or more WTL messages.

In another embodiment, the RM platform 109 updates the status of the CT WTL message and the CS user request. For example, the RM platform 109 relays a leaving-now message (LN) from the CT user to the CS user. The LN message indicates to the CS user that the parking space is and/or will become available in the very near future. Further, the RM platform 109 relays a when-to-arrive (WTA) message from the CS user to the CT user. A WTA message can be generated by the CS user, by the RM platform 109 and/or a combination thereof. For example, a WTA message includes, at least in part, a CS user's estimated time of arrival to acquire, consume, or utilize one or more resources. Further, a WTA message can be a resource use message generated, at least in part, by a CS user.

In another embodiment, user privacy may be protected by not disclosing one or more parameters included in WTL information. For instance, the WTL messages can be listed while concealing the absolute position information of the CT user and/or the resource.

In another embodiment, a CS user can confirm whether the parking space was successfully acquired. Once the confirmation is received at the RM platform 109, the status of the resource availability message can be updated. If a CS user confirms that acquiring the parking space was successful, RM platform 109 rewards one or more (S) points to the CT user and one or more (N-S) points back to the CS user as, for example, discount of buying the resource availability (parking space) information. However, if the CS user confirms that acquiring the resource (parking space) was unsuccessful, then the RM platform 109 refunds one or more points (R points out of the N points) back to the CS user. Additionally, the RM platform 109 may deduct one or more (T) points from the CT user and/or cause input to CT user account information (e.g., at a social networking site, reputation rating, credibility, etc.).

In one embodiment, one or more incentives are provided to the CS user for providing actual feedback on utilization of the one or more resources whereby the actual feedback substantially indicates whether acquiring the one or more resources was successful or not. Further the RM platform 109 controls awarding of N, S, R, and T in order for the CS user to gain a substantial value for providing actual success feedback (e.g., truthful) to the RM platform 109 For example, the CS user can be awarded N-S points when confirming one or more resource utilization and further one or more S points upon reselling the one or more resources, which potentially can be greater than the R (refund) points for indicating that the CS user was unsuccessful in acquiring the one or more resources. In another example, a CS user can have more incentives to provide substantially truthful feedback when compared to proving a false feedback for obtaining a refund of one or more points.

In another embodiment, a CS user can confirm unsuccessful resource acquisition by providing one or more information. For example, a CS user reported that a reserved parking space (e.g., on third floor section C of a parking structure) based on a WTL message is not available. Additionally, if the CS user utilizes a different parking space (on fourth floor section D) and later provides a WTL message on the other parking space, which proves to be an available resource by a second CS user, then the CS user may receive a full refund of one or more (N) points instead of partial refund of one or more points (R). In another embodiment, a CS user can request a "SpotCheck" whereby the CS user can provide one or more evidence that the CS user did not utilize the one or more resources indicated the one or more WTL messages and can request a full refund. For example, the CS user can send one or more pictures from one or more locations indicating location of the CS user, the CS device, the CS vehicle, and the like.

In another embodiment, CT users may be restricted to a number of attempts on selling one or more WTL messages so to, at least, prevent/reduce the possibility of malicious CT users and/or robots from spamming the RM platform 109. For example, one or more restricting mechanism can be by time and by location of the CT user. In one instance, a CT user may have at most 3 unsold/confirmed failed WTL messages within a time window (e.g., an hour). Further, Ct user may have at most 3 unsold/confirmed failed WTL messages within a range of 1 square mile in one day. Moreover, another mechanism "SpotCheck" can be employed to enquire CT and CS users to provide information (in-scene proof) that the CT and/or the CS users are located at claimed locations (e.g., to prove that a CT and/or CS vehicle instead of a user device) is at the claimed location at a claimed time. For example, an in-scene proof can include a geo-tagged image of the car plate, a Geo-tagged message including an ID number retrieved from the vehicle system (e.g., via Bluetooth) and the like. Alternatively, in another embodiment, one or more WTL and/or LN messages received at the RM platform 109 can be compared to the location of the CT user and/or the CT user device. For example, one or more WTL messages can be compared to location of the CT user and/or the CT user device to verify one or more criteria, for example, whether the CT user and/or the CT user device are substantially at or near the resource identified in the WTL message, the CT user and/or the CT user device are non-stationary (e.g., movement detection via one or more user device sensors such as an accelerometer), the CT user has reported one or more other WTL messages, and the like. In another embodiment, the LN message is analyzed against one or more criteria, for example, to determine the CT user and/or the CT user device location and to determine whether the CT user and/or the CT user device are moving (e.g., movement detection via one or more user device sensors such as an accelerometer). In one scenario, the CT user and/or the CT user device (e.g., a user vehicle) are moving away from the location identified in the LN message.

In another embodiment, if a CT user and/or a CT user device are detected as moving (e.g., in a vehicle) "activity recognition" after sending the WTL and the LN messages, it can be determined that the CT user and/or the CT user device can potentially be a malicious user/user device that randomly, carelessly and/or intentionally create one or more WTLs. Further, once a user is detected being away from a user device (e.g., a vehicle) in both cases, it can be determined that the user is potentially a malicious user creating one or more WTLs. Further, once noted above technique is used, potentially in conjunction with a geo-tagged based technique; it can reduce the frequency of using a geo-tagged based technique. Moreover, the activity recognition based technique can be used, in conjunction with geo-tagged location technique (e.g., providing a geo-tagged photo), to avoid potential CT users from being mischaracterized in the RM platform 109, service providers and/or other users.

In another embodiment, a CS user needs to deposit one or more (N) points with the RM platform 109 to obtain a WTL message. For example, a CS user wishes to find a parking space in 15 minutes and deposits one or more (N) points with the RM platform 109 to know if there are any Ct users leaving in 15 minutes. If there is none, the one or more (N) points are refunded immediately, but if there is at least one, the WTL information is presented to the CS user and blocked from view by other CS users.

In another embodiment, rate of substantially successful resource acquisition (e.g., obtain a parking space, loose reservation system, etc.) can, at least, indicate how a crowd-sourcing resource availability system performs. If the rate is close to 1, then the loose reservation system has close performance to an exclusive reservation system. One or more criteria, at least in part, influencing the success rate can be the time (X) when a CT user makes the resource available and the time (Y) when a CS user is available to acquire the resource. For example, if Y is a less than (but substantially close to) X, (e.g., the CS user may see the CT user releasing the resource) then the success rate may be substantially close to 1. Further, if Y is greater than (but substantially close to) X, then the success rate may still be substantially close to 1.

In another embodiment, the RM platform 109 can provide a service whereby one or more CT users, CT user devices, CS users and/or CS user devices can substantially communicate with one or more of the aforementioned user and/or devices in order to share one or more messages. The RM platform 109 can perform as an intermediary service whereby the service can provide a mechanism for the users and/or the user devices to exchange one or more messages (e.g., WTL, WTA, LN and the like) via one or more communications methods (e.g., SMS, MMS, IM, emails, voice calls and the like). Furthermore, the CT users/devices, CS users/devices can choose/accept to communicate directly with one or more of the aforementioned in order to exchange information, messages and the like. Moreover, the RM platform 109 can provide one or more methods for the users and/or the devices to establish and continue direct and/or assisted communications while substantially maintaining anonymity and privacy. Assisted and/or direct communications between the CT users/devices and CS users/device potentially can increase the success rate of sharing resource availability information and successful acquiring of the one or more available resources.

In certain embodiments, the RM platform 109 assumes that both X and Y follow a Gaussian distribution. In one embodiment, the distributions of X and Y can be determined and/or calculated from historical data. By way of example, the RM platform 109 builds the historical data using WTL messages, LN messages, WTA messages, and CS's confirmation with respect to resources previously mediated by the RM platform 109. In one case, the time difference between WTL and LN explains the standard deviation of X distribution while the time difference between WTA and confirmation denotes the standard deviation of Y distribution. Since the difference of two Gaussian distributions is still a Gaussian distribution, the distribution of Y-X can be determined as well according to, for instance, the following equations:

$$X \sim N(\mu\_x, \Sigma\_x^2), Y \sim N(\mu\_y, \Sigma\_y^2), Y-X \sim N(\mu\_x-\mu\_y, \Sigma\_x^2+\Sigma\_y^2)$$

As discussed above, in addition to rewarding users for sharing information associated with availability of a location-based resource (e.g., parking space), automation and simplification of the reporting process is another important incentive, wherein the users only need to launch an application (e.g., a crowd parking application) and keep it running (e.g., in foreground or background. In one embodiment, an activity recognition engine (e.g., in the crowd parking application) is executed and begins collecting samples (e.g., sampling) of an accelerometer sensor on the user device. In one example, the sampling of the accelerometer is duty-cycled (e.g., 25 seconds active and 100 seconds sleep, example sampling rate of 20 Hz) so to reduce energy consumption at the user device.

In another embodiment, accelerometer readings are utilized to determine (e.g., infer) whether or not a user device is in a driving mode (e.g., a user carries a device in a driving vehicle.) For example, accelerometer data can be used to distinguish driving from other activities, such as running, walking, or stationary. Further, the accelerometer may be aligned (e.g., remove a gravity component in sampling information) such that the accelerometer sampling can be utilized to derive a user speed change. Furthermore, a predetermined sampling time is utilized to remove any distortions (e.g., jitter) in the accelerometer sampling data. Moreover, one or more processes are utilized (e.g., low-pass filter, high-pass filter, Fourier Transform, etc.) to obtain low-frequency and high-frequency components for distinguishing driving activity from other activities.

In one use case scenario, a GPS localization process is also duty-cycled to reduce energy consumption at the user device. In one example, of a GPS system utilizes an initialization time of about 30 seconds, a GPS sampling process may also be duty-cycled as one minute active and five minutes sleep. The GPS sampling process can also remove the false alarms from the accelerometer-based driving state inference. In another embodiment, the GPS sampling information are utilized to confirm/verify a state inferred by sampling the accelerometer readings (e.g., reducing/eliminating false state inferences.) In use case scenario, if the GPS information and the accelerometer sensor readings do not substantially agree as to the user state (e.g., driving), then GPS sampling is not utilized again until another sampling of the accelerometer sensor indicates a new event (e.g., driving.)

In one embodiment, the activity recognition engine detects a change from a driving event to a non-driving event (e.g., walking, stopped, etc.) Once the accelerometer sensor detects and/or indicates a change from driving to non-driving event, then the GPS information is also utilized to confirm the change. Further, if the GPS information (e.g., speed) confirms the change from driving to non-driving and if the accelerometer sensor on the device detects a change from a stationary event to a walking event, then the crowd parking application determines that the user potentially had a parking event (e.g., parked the user vehicle at a parking space) and further, the crowd parking application determines (e.g., via GPS, via cellular network information, via WLAN, etc.) a substantially accurate location of the parking space. Furthermore, the crowd parking application may cause a transmission of one or more information items associated with the parking event, including a time and parking space location, to the RM platform 109. In another embodiment, the user and/or one or more other users may receive the one or more information items associated with the parking event and/or view the information displayed on a map application. In one use case scenario, the one or more other users may review the one or more information items (e.g., elapsed time of parking) associated with a parking event at a given parking space and estimate a possible time when the given parking space may become available and plan to be there at around that time.

In one embodiment, a user may define in a user profile as to when, where, how and if the user wishes to participate in and utilize the crowd parking system. In another embodiment, the crowd parking system may automatically determine a region, a time of day, a time of week, a time month in conjunction with a user profile to determine if a user may wish to utilize the crowd parking system. For example, the crowd parking system can determine that a user may require a parking space in a busy area (e.g., downtown area in San Francisco), during a weekend, during a holiday, and the like. In one embodiment, once the activity recognition engine determines that the user is in a driving mode (e.g., a user carries a device in a driving vehicle) and will require assistance with locating a parking space, the crowd parking application utilizes location information (e.g., GPS) to determine user location.

As discussed above, the crowd-sourced parking system can also provide an estimation of time on when a user may be releasing a specific parking space so that other users may accordingly plan to arrive at the specific parking space if they wish to utilize it. The users can also benefit by not having to search and/or wait (e.g., additional time buffer) before the parking space may be available, which can alleviate frustrations and wait times usually associated with locating a parking space is a crowded environment. In various embodiments, the RM platform 109 further automates estimation of leaving-time associated with a user and a parking space being utilized by the user. The automation mechanism can significantly reduce the manual input and operation required of a user while reducing potential human error in estimating the leaving time. In various use scenarios, it can be difficult and frustrating for users to provide an estimation of when the user may be releasing a parking space while there may be various factors, which may cause unforeseen changes to the user schedule.

In one embodiment, the system 100 determines at least one geo-fence (e.g., one or more circular rings) encompassing the one or more locations, wherein the one or more resource availability messages are initiated based, at least in part, on a monitoring of location information associated with the one or more contributing devices with respect to the at least one geo-fence. In one use case scenario, the RM platform 109 determines (e.g., calculates) a set of three geo-fences (e.g., circular rings, hexagons, octagons, etc.) wherein a parking space is a center point for the set. For example, an inner-most geo-fence (e.g., circular) may have a radius of 50 meters, which may correspond to about one minute of walking for a user. Further, a second geo-fence (e.g., circular) may have a radius of about 100 meters, which may correspond to about two minutes of walking for a user. Furthermore, an outermost geo-fence has a radius of 200 meters, which may correspond to about four minutes of walking for a user. In another embodiment, the one or more activity states are based, at least in part, on one or more transportation events including, at least in part, a walking event, a driving event, a parking event, or a combination thereof. For example, one or more sensors on the device; such as an accelerometer, and GPS; may be utilized to detect if a user is driving (fast moving), pedestrian (walking), stopped, and the like. Further, once a change of an event is detected (e.g., driving, stopping, walking, etc.), the client application on the device may determine and transmit a GPS location and a timestamp of the event, indicating that the user has begun walking, driving, bicycling, stopped, parked the user vehicle at a parking space, and the like. In another embodiment, the system 100 may utilize one or more WLAN and/or cellular network information items to determine the change of an event associated with the device.

In another embodiment, a user parks a user vehicle and the RM platform 109 begins the process to determine a movement direction of the user (e.g., while carrying the device.) Initially, the user is in the innermost geo-fence. Further, the geo-fence may have various numbers of elements (e.g., many circles) and once the user begins moving away from the vehicle and the parking space, the user begins crossing the elements of the geo-fence (e.g., crossing first, second, third, etc., circles away from the vehicle.) Conversely, once the user begins moving/walking back toward the vehicle/parking space, the user will cross the elements of the geo-fence, for example, crossing the outermost first, then next one and next one, and the like, until the user is back in the innermost element (e.g., at center of geo-fence).

In various embodiments, the RM platform 109 and/or a client application on the device may estimate a user leaving time as the user is walking back toward the parking space/ vehicle. For example, one or more estimates may be for the crossing of each of the one or more geo-fence elements. In another embodiment, if a trace/path from the outermost fence to the 2nd fence points to the parking space within an angle of less than 30 degree, the estimation may be that the user is walking toward the parking space. In another example, if the trace from the outer fence to the second fence cannot conclude anything, the RM platform 109 may continue tracking the trace from the second fence to the innermost fence. Further, if the trace from the second fence to the innermost fence points to the parking space, then the estimation may be that the user is walking toward the parking space. In another example, if the trace from the outer geo-fence ring to the second ring is not clear (e.g., not sure), then the system 100 may continue tracking the user movement for more information.

In another embodiment, the GPS sampling process may be suspended when the user reaches the outermost fence. Further, an accelerometer-based step counter may be initiated to begin counting of the displacement of the user. In one example, if the GPS sampling is turned off for about 30 seconds when the user reaches outermost fence, (e.g., 30 seconds is about one half of the walking time from the outermost fence to the second fence) and if the user decides to walk directly back to the parking space/vehicle after just crossing the outermost fence, there still will be sufficient time to trace the user location make an estimation of the user leaving time.

It is noted that the above discussion and descriptions are only example embodiments, calculations and ratios where further methods may be utilized for similar results.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, resource management platform 109, and service platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
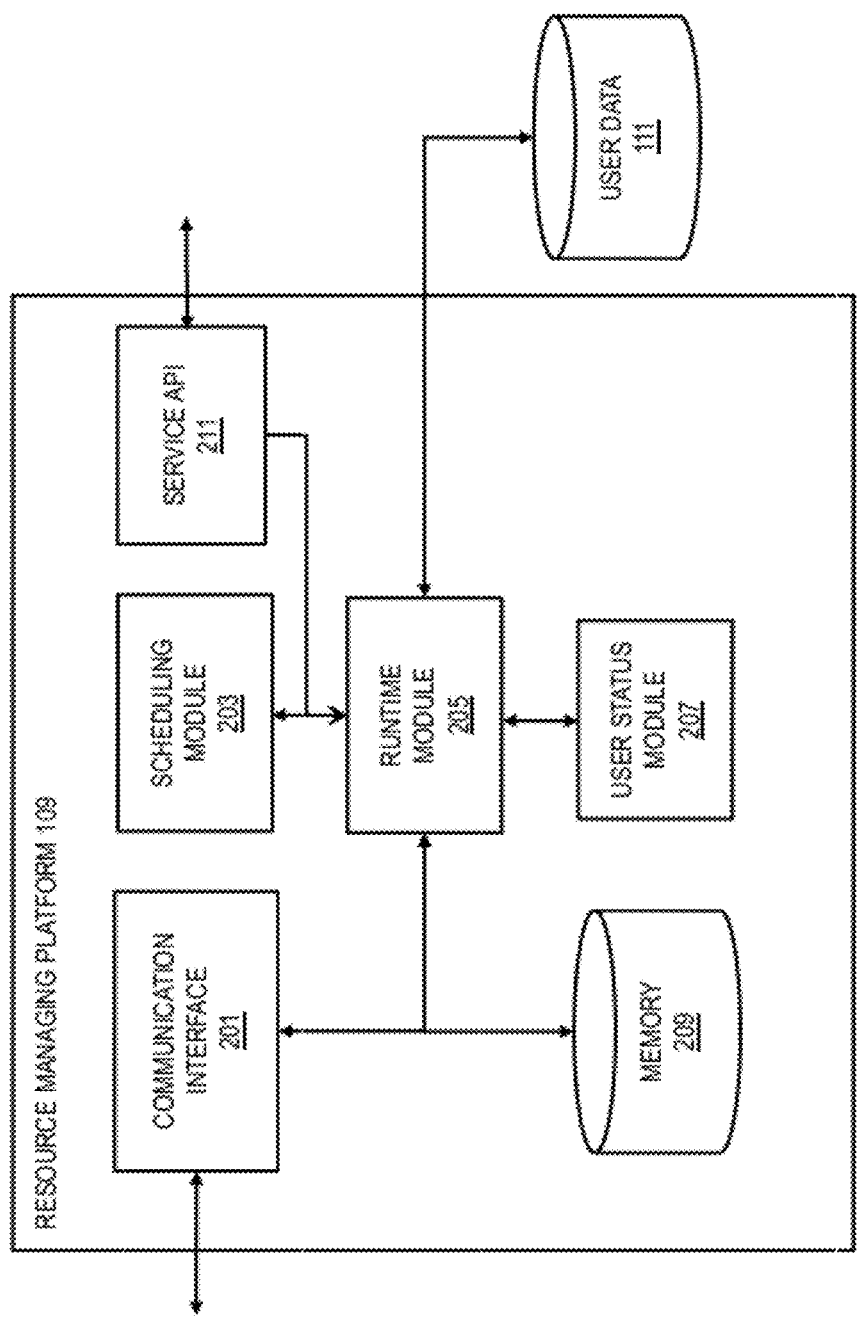
FIG. 2 is a diagram of the components of a resource management platform, according to an embodiment.

FIG. 2 is a diagram of the components of a resource management platform, according to an embodiment. By way of example, resource management platform 109 includes one or more components for providing management and/or coordination of resource availability information. It is contemplated that the functions of these components may be combined in one or more components or performed by other components of equivalent functionality. In this embodiment, the resource management platform 109 includes a communication interface 201, a scheduling module 203, and a runtime module 205 that can execute processes, a user status module 207 that can be used to determine the status of one or more UEs 101 associated with users, and a memory 209 includes a service API 211.

In one embodiment, the resource management platform 109 includes a communication interface 201. The communication interface 201 can be used to communicate with a UE 101. The resource management platform 109 can receive information from the UE 101 via the communication interface 201 via methods such as internet protocol, MMS, SMS, GPRS, or any other available communication method. The UE 101 can send information to the resource management platform 109 for many reasons, such as to update the status of applications executing on the UE 101 as well as to update the acquisition status of the resource, updating user data 111, etc. Further, the runtime module 205 may utilize the communication interface 201 to provide status updates to the UE 101. Further, the runtime module 205 may utilize the service API 211 (e.g., in conjunction with the communication interface 211) to interact with applications 101 and/or other applications, platforms, and/or the like.

The scheduling module 203 may additionally be updated using the communication interface 201. The scheduling module 203 may be utilized to schedule resource acquisition and/or resource availability information. Schedules and/or alerts may be stored in the memory 209, and/or user data 111. The scheduling module 203 may change scheduling alerts based on user input. Further, the scheduling module 203 may use the communication interface 201 to communicate with other services (e.g., RM platform 109) that may provide the runtime module 205 with updates to the acquisition event. In this manner, the runtime module 205 may monitor changes to the acquisition event (e.g., if the resource availability and/or acquisition time changes).

The user status module 207 can track the status of UEs 101. The status may be utilized to determine if one or more users have enough credits, user location information, user calendar information. Further, the user status module 207 may be utilized by the runtime module 205 to provide alerts to the UEs 101 via the communication interface 201 to update the users of the status of the other users. In certain embodiments, resource availability applications 107 on the UEs 101 may be configured to send a ready or online status message or confirmation to the service platform 103 when the user is ready. The resource availability application 107 may require that a user manually provide input that the user is ready to attempt to acquire the one or more resources. In other embodiments, the user status module 207 may request that UEs 101 send a user status message (e.g., via an internet connection, via SMS, via MMS, or via another communication method). Further, the user status module 207 may additionally receive status updates from users indicating whether the user has been able to acquire one or more requested resources. During and/or after the resource acquisition, the runtime module 205 may update the status of one or more resources based on updates from the users' UEs 101.

Figure 3:
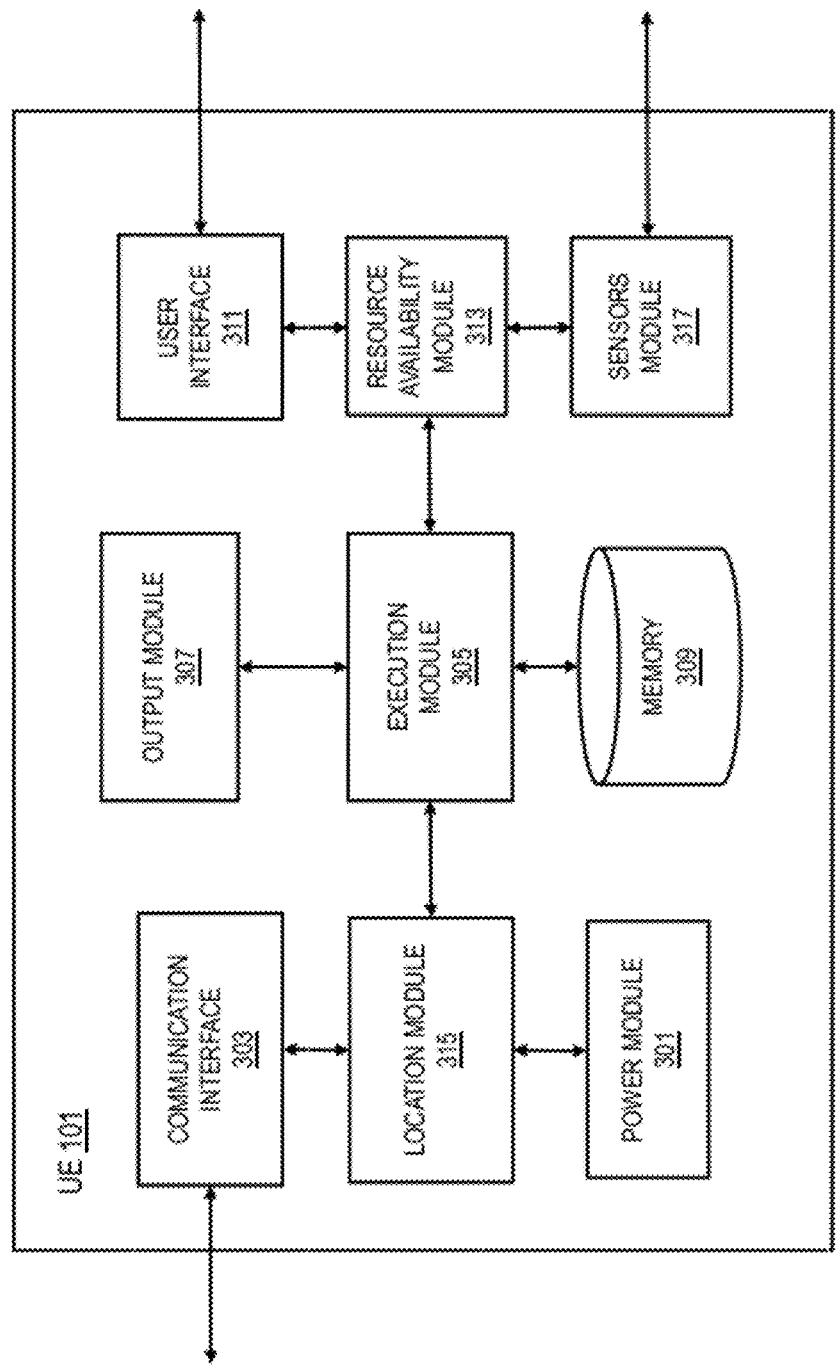
FIG. 3 is a diagram of the components of user equipment, according to an embodiment.

FIG. 3 is a diagram of the components of user equipment, according to an embodiment. It is contemplated that the functions of these components may be combined in one or more components or performed by other components of equivalent functionality. In this embodiment, the UE 101 includes a power module 301 to provide power and power controls to the UE 101, a communication interface 303 to communicate over a network, an execution module 305 to control the runtime of applications executing on the UE 101, an output module 307, a memory 309, a user interface 311 to output and receive input at the UE 101, and a location module 315 to determine a location of the UE 101, sensors module 317 which includes various sensors such as accelerometers, gyroscopes, compass, motion sensors, and the like.

In one embodiment, the UE 101 includes a power module 301. The power module 301 provides power to the UE 101. The power module 301 can include any type of power source (e.g., battery, plug-in, etc.). Additionally, the power module 301 can provide power to the components of the UE 101 including processors, memory 309, and transmitters.

The communication interface 303 may include multiple means of communication. For example, the communication interface 303 may be able to communicate over SMS, internet protocol, instant messaging, voice sessions (e.g., via a phone network), or other types of communication. The communication interface 303 can be used by the execution module 305 to communicate with other UEs 101, the resource management platform 109, resources 113 and other devices. In some examples, the communication interface 303 is used to transmit information (e.g., resource availability information, user status information, etc.) to the service platform 103.

In one embodiment, a UE 101 includes a user interface 311. The user interface 311 can include various methods of communication. For example, the user interface 311 can have outputs including a visual component (e.g., a screen), an audio component, a physical component (e.g., vibrations), and other methods of communication. User inputs can include a touch-screen interface, a scroll-and-click interface, a button interface, etc. In certain embodiments, the user interface 311 may additionally have a vocal user interface component. As such, a text-to-speech mechanism may be utilized to provide textual information to the user. Further, a speech-to-text mechanism may be utilized to receive vocal input and convert the vocal input into textual input. Moreover, the user interface 311 may be utilized to present status information as to the status of a resource and/or resource availability information.

In certain embodiments, a resource availability application 107 may run on the execution module 305. The resource availability application 107 may utilize the user interface 311 to receive information regarding an available resource and/or acquisition of the resource. Further, this information may be transmitted via the communication interface 303 to the RM platform 109. Moreover, the information may be utilized by a resource availability module 313 to alert the user about an available resource for acquisition. The resource availability module 313 may additionally or alternatively utilize information from a RM platform 109 (e.g., a resource availability message) for determining alerts. This information may be stored in the memory 309 until utilized. The resource management module 109 then returns the results of a request to the requesting UE 101 via the output module 307 and the service application programming interface (API) 211.

In one embodiment, the output module 307 facilitates a creation and/or a modification of at least one device user interface element, at least one device user interface functionality, or a combination thereof based, at least in part, on information, data, messages, and/or signals resulting from any of the processes and or functions of the service platform 103 and/or any of its components or modules. By way of example, a device user interface element can be a display window, a prompt, an icon, and/or any other discrete part of the user interface presented at, for instance, the UE 101. In addition, device user interface functionality refers to any process, action, task, routine, etc. that supports or is triggered by one or more of the user interface elements. For example, user interface functionality may enable speech to text recognition, haptic feedback, and the like. Moreover, it is contemplated that the output module 227 can operate based at least in part on processes, steps, functions, actions, etc. taken locally (e.g., local with respect to a UE 101) or remotely (e.g., over another component of the communication network 105 or other means of connectivity).

In one embodiment, the location module 315 can determine a user's location. The user's location can be determined by a triangulation system such as a global positioning system (GPS), assisted GPS (A-GPS), Cell of Origin, wireless local area network triangulation, or other location extrapolation technologies. Standard GPS and A-GPS systems can use satellites 119 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 315 may also utilize multiple technologies to detect the location of the UE 101. GPS coordinates can provide finer detail as to the location of the UE 101. As previously noted, the location module 315 may be utilized to determine location coordinates for use by the application 107. In another embodiment, the UE 101 may utilize a local area network (e.g., WLAN) connection to determine the UE 101 location information, for example, from an Internet source (e.g., a service provider).

Figure 4:
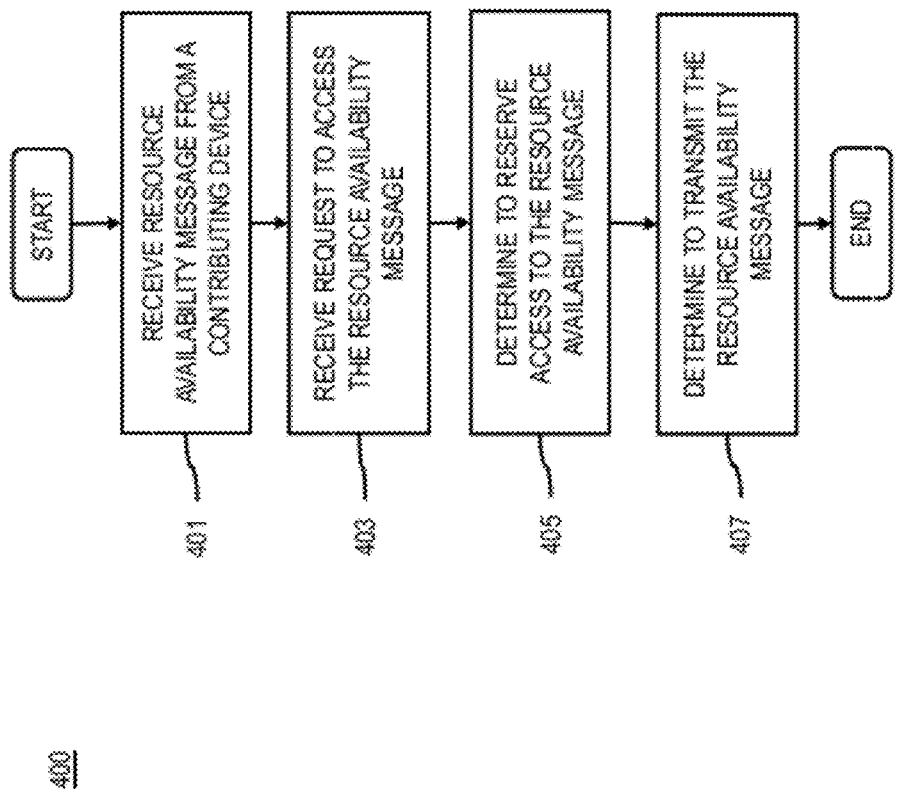
FIG. 4 is a flowchart of a process for sharing and managing resource availability information, according to an embodiment.

FIG. 4 is a flowchart of a process for receiving and management resource availability data, according to an embodiment. In one embodiment, the runtime module 205 of the service platform 103 performs the process 400 and is implemented in, for instance, a chip set including a processor and a memory as shown FIG. 11. In certain embodiments, the execution module 305 of a UE 101 may perform one or more steps of the process performed by the runtime module 205. As such, the runtime module 205 or execution module 305 can provide means for accomplishing various parts of the process 400 as well as means for accomplishing other processes in conjunction with other components. In step 401, the runtime module 205 receives resource availability message from a contributing device (e.g., a CT user). The resource availability message may be received at the runtime module 205 via a communication interface 201. In certain embodiments, resource availability message is data that can be utilized to coordinate the sharing of the one or more resource availability information with one or more users. As such, resource availability information may include information such as geographical location information provided, for example, by a GPS system, cellular network, space number, a street address, location in a building, location at an establishment, a landmark, and/or other information which could assist in identifying the location of the resource. Further, the resource availability information may further include information associated with the time of the availability and/or alerts for notifying one or more users of the resource availability information.

At step 403, the runtime module 205 causes, at least in part, receive request to access the resource availability message. In an embodiment, one or more users (e.g., CS users) send one or more requests for accessing resource availability information on one or more resources they desire. The request can include one or more data, for example, an estimated time that the CS user would need the resource. For example, a driver of a vehicle is seeking a vehicle parking space at a venue and expects to be substantially near the venue at a certain time.

Moreover, at step 405, the RM platform 109, at least in part, determines to reserve access to the resource availability message. In one embodiment, the RM platform 109 may have one or more resource availability messages and one or more requests for access to one or more resource availability information whereby the RM platform 109 needs to evaluate the one or more resource availability messages and the one or more requests for determining one or more options, present the one or more options to the one or more CS users, and reserve access to the resource availability message based, at least in part, on the evaluation and a CS user selection. For example, a driver of a vehicle (e.g., a CS user) is seeking a vehicle parking space near a shopping mall and the RM platform 109 may have one or more messages indicating that there are one or more spaces available near the CS users' requested location. Then, the RM platform 109 evaluates the messages and presents one or more options (e.g., messages) to the CS user. The CS user responds to the RM platform 109 indicating selection of one or more messages. The RM platform 109 reserves the one or more messages for access by the CS user. In another embodiment, the RM platform 109 determines a message substantially meeting the requirements of the CS user, indicates to the CS user that a resource is available and upon acceptance by the user, the RM platform 109, at least in part, reserves the message for use by the CS user. Then, at step 407, the RM platform 109 determines, at least in part, to transmit the resource availability message to the CS user.

Figure 5:
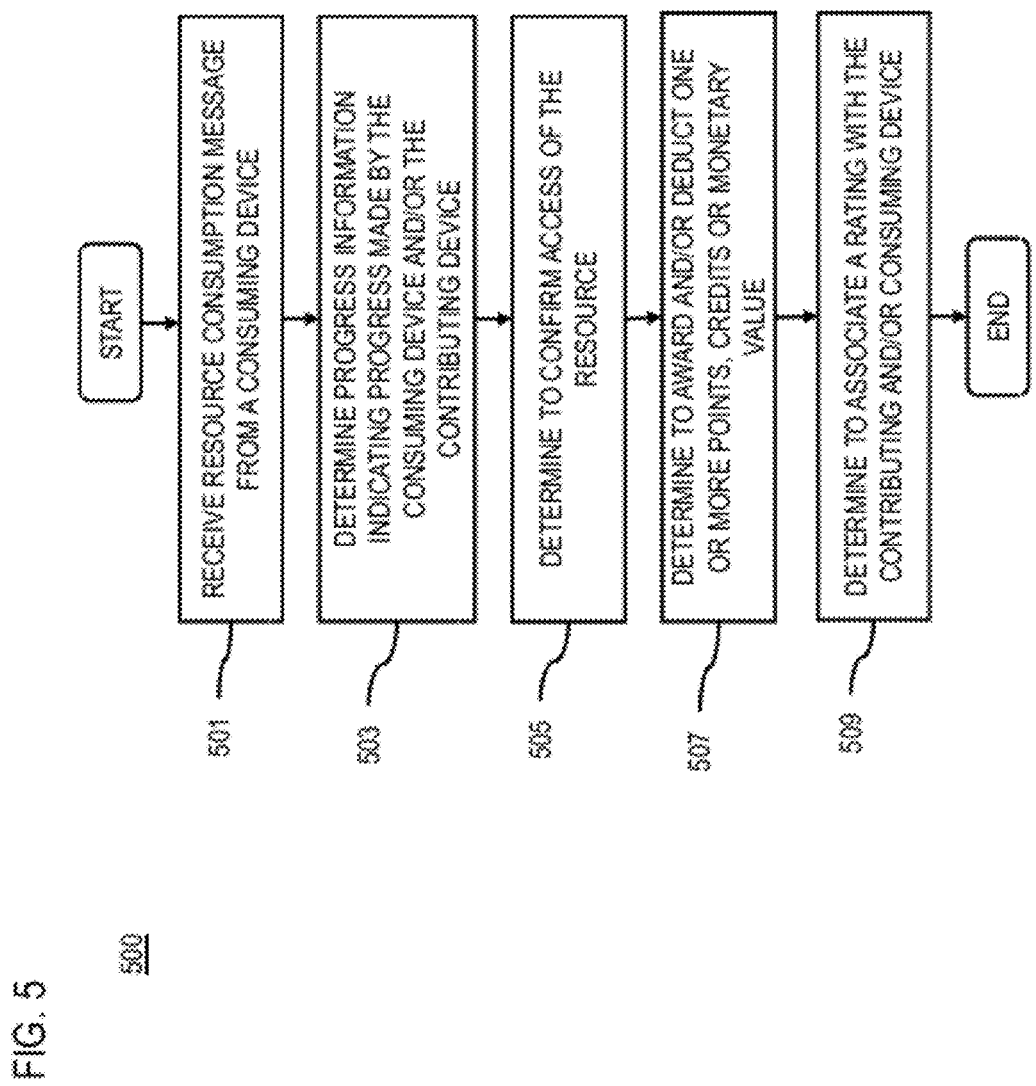
FIG. 5 is a flowchart of a process for receiving and processing a resource consumption message, according to an embodiment.

FIG. 5 is a flowchart of a process for receiving and processing a resource consumption message, according to an embodiment. In one embodiment, the runtime module 205 of the service platform 103 performs the process 500 and is implemented in, for instance, a chip set including a processor and a memory as shown FIG. 11. In certain embodiments, the execution module 305 of a UE 101 may perform one or more steps of the process performed by the runtime module 205. As such, the runtime module 205 or execution module 305 can provide means for accomplishing various parts of the process 500 as well as means for accomplishing other processes in conjunction with other components. In step 501, the RM platform 109 receives a resource consumption message from a CS device. In one embodiment, the CS device, at least in part, responds with a message indicating that one or more messages indicating resource availability have been, are being and/or will be consumed. For example, a CS user utilizes a CS device (e.g., UE 101)

to transmit a message to the RM platform 109 indicating that the CS user intends to consume one or more resource availability messages. In step 503, the RM platform 109 determines progress information indicating progress made by the CS device and/or the CT device. In one embodiment, the RM platform 109 evaluates the progress of the CT user and the CS user. For example, the RM platform 109 determines that the CT user in 10 minutes will release one or more resources being consumed by the CT user and compares that information with the estimated time that the CS user will be able to consume the one or more resources. In step 505, the CS user determines to confirm access of the resource. In one embodiment, the CS user confirms that the CS user has accessed the one or more resources. For example, the CS user confirms that access of a vehicle parking space. The confirmation can substantially be made by the CS user and/or the CS device UE 101. In step 507, determine to award and/or deduct one or more points, credits or monetary value. In one embodiment, upon receiving confirmation of access from the CS user, the RM platform 109 determines to award one or more points to the CT user and/or deduct one or more points from the CS user. In one embodiment, the RM platform 109 awards to and/or deducts from one or more user accounts at a service provider site, at a social network site, at a bank and the like. In step 509, the RM platform 109 determines to associate a rating with the contributing and/or consuming device. In one embodiment, the RM platform 109 amends information to the CT user's and/or CS user's rating. The rating information may already exist or the RM platform 109 can create rating information for the CT users and/or the CS user. For example, the rating information can indicate the success rate on the resource availability message from the CT user and/or success rate of consumption by the CS user. Further, the CT user may use a contributing device (e.g., UE 101a) to communicate with the central management platform (e.g., RM platform 109), one or more other user devices UEs 101, a service provider, a communication network 105 and the like. Furthermore, a contributing device may communicate substantially automatically and/or independently (e.g., with and/or without user participation) with the central management platform, another user device UEs 101, a service provider, a communication network and the like. Moreover, the CS user may use a consuming device (e.g., UE 101b) to communicate with the central management platform, one or more other user devices UEs 101, a service provider, a communication network and the like. Furthermore, a consuming device may communicate substantially automatically and/or independently (e.g., with and/or without user participation) with the central management platform (e.g., RM platform 109), another user device UEs 101, a service provider, a communication network and the like.

Figure 6:
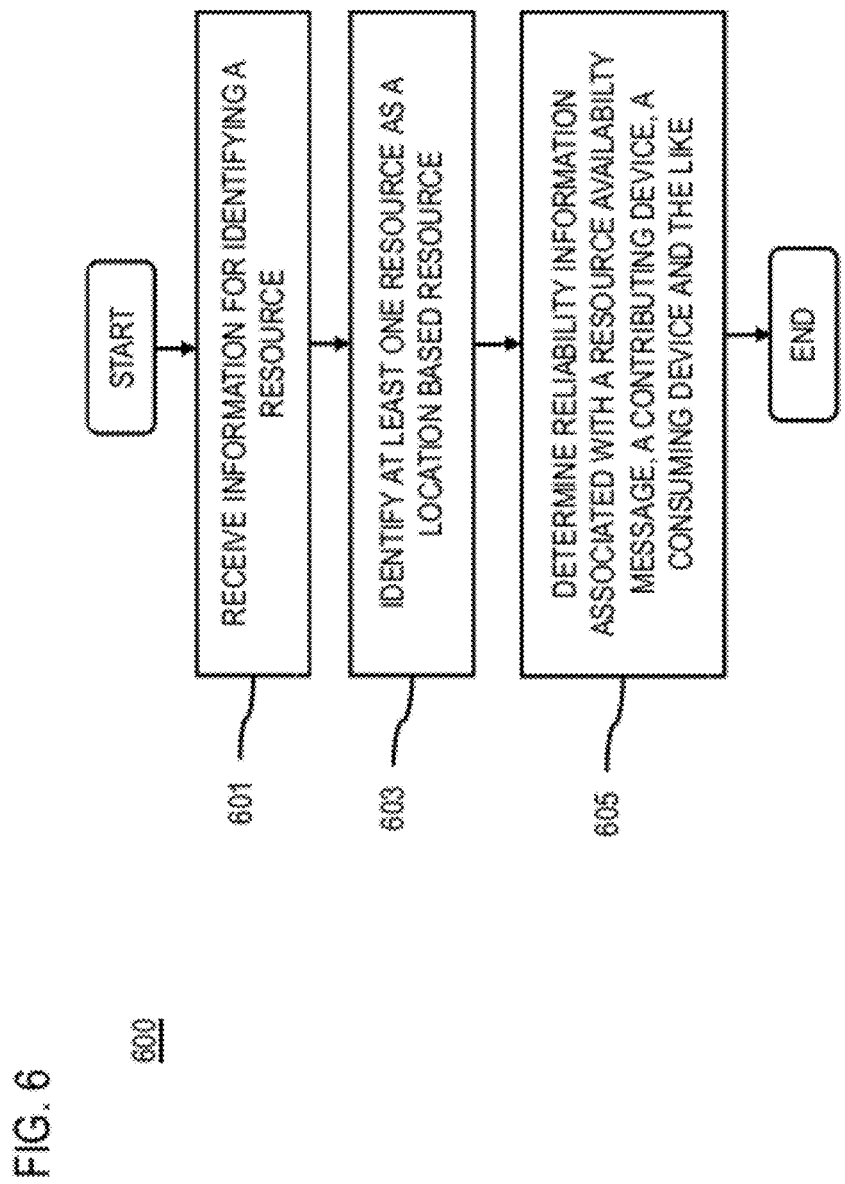
FIG. 6 is a flowchart of a process for receiving resource identifying information and determining reliability of the information, according to an embodiment.

FIG. 6 is a flowchart of a process for receiving resource identifying information and determining reliability of the information, according to an embodiment. In one embodiment, the runtime module 205 of the service platform 103 performs the process 600 and is implemented in, for instance, a chip set including a processor and a memory as shown FIG. 11. In certain embodiments, the execution module 305 of a UE 101 may perform one or more steps of the process performed by the runtime module 205. As such, the runtime module 205 or execution module 305 can provide means for accomplishing various parts of the process 600 as well as means for accomplishing other processes in conjunction with other components. In step 601, the RM platform 109 receives information for identifying a resource. In one embodiment, the resource availability message includes information for identifying one or more resources. For example, the information can include geographical location information such as GPS, network provided location information, location address, landmark, establishment name, vehicle description, location name, and the like. In step 603, identify at least one resource as a location based resource. In one embodiment, the resource a location based resource, for example, a vehicle parking space, a personal space location (e.g., a seat at a stadium, a seat at an establishment, etc.) and the like. In step 605, the RM platform 109 determines reliability information associated with a resource availability message, a contributing device, a consuming device and the like. In one embodiment, the RM platform 109 determines the reliability information based, at least in part, on the CT user and/or device rating, CS user and/or device rating, a resource, and the like.

FIG. 6A is a flowchart of a process for automatically detecting, determining and reporting on utilization and/or availability of a location-based resource, according to one embodiment. In one embodiment, the runtime module 205 of the service platform 103 perform the process 620 and is implemented in, for instance, a chip set including a processor and a memory as shown FIG. 11. In certain embodiments, the execution module 305 of a UE 101 may perform one or more steps of the process 620. As such, the runtime module 205 or execution module 305 can provide means for accomplishing various parts of the process 600 as well as means for accomplishing other processes in conjunction with other components.

In step 621, the RM platform 109 processes and/or facilitates a processing of one or more sensor information associated with the one or more contributing devices to determine one or more locations associated with the location-based resource. For example, a UE 101 can record, capture and/or report one or more GPS and/or communication network (e.g., cellular, WLAN, etc.) information items in order to ascertain location information of a parking space, which a user may be utilizing and/or intends to utilize. In one example, the user has parked a user vehicle in a parking space.

In step 623, the RM platform 109 determines at least one geo-fence encompassing the one or more locations, wherein the one or more resource availability messages are initiated based, at least in part, on a monitoring of location information associated with the one or more contributing devices with respect to the at least one geo-fence. In one use case scenario, the RM platform 109 determines (e.g., calculates) a set of three geo-fences (e.g., circular rings, hexagons, octagons, etc.) wherein a parking space is a center point for the set. For example, an inner-most geo-fence (e.g., circular) may have a radius of 50 meters, which may correspond to about one minute of walking for a user. Further, a second geo-fence (e.g., circular) may have a radius of about 100 meters, which may correspond to about two minutes of walking for a user. Furthermore, an outer-most geo-fence (e.g., circular) has a radius of 200 meters, which may correspond to about four minutes of walking for a user. In another embodiment, the one or more activity states are based, at least in part, on one or more transportation events including, at least in part, a walking event, a driving event, a parking event, or a combination thereof. For example, one or more sensors on the device; such as an accelerometer, and GPS; may be utilized to detect if a user is driving (fast moving), pedestrian (walking), stopped, and the like. Further, once a change of an event is detected (e.g., driving, stopping, walking, etc.), the client application on the device may determine and transmit a GPS location and a timestamp of the event, indicating that the user has begun walking, driving, bicycling, stopped, parked the user vehicle at a parking space, and the like. In another embodiment, the system 100 may utilize one or more WLAN and/or cellular network information items to determine the change of an event associated with the device.

In step 625, the RM platform 109 and/or one or more applications on the UE 101 process and/or facilitate a processing of the one or more sensor information to determine one or more activity states, one or more transitions between the one or more activity states, or a combination thereof, wherein the determination of the one or more locations, the at least one geo-fence, or a combination thereof, is further based, at least in part, on the one or more activity states. For example, a CT device (e.g., a mobile phone) executes one or more algorithms in a client application (e.g., a crowd parking application) and utilizes one or more motion sensors (e.g., an accelerometer) and GPS information to detect one or more movement activities (e.g. driving, walking, etc.) associated with the CT device. In one use case scenario, an activity recognition engine (e.g., in the crowd parking application) is executed and begins collecting samples (e.g., sampling) on an accelerometer sensor on the user device. In one embodiment, the sampling of the accelerometer is duty-cycled, for example as 25 seconds active and 100 seconds sleep, so to reduce energy consumption at the user device, wherein an example sampling rate is 20 Hz.

In step 627, the RM platform 109 processes and/or facilitates a processing of the one or more sensor information to determine a reentry of the one or more contributing devices within the at least one geo-fence. In one example, a geo-fence includes two circular rings (e.g., centered around a parking space/vehicle) wherein the user is on the outside of the outermost ring (e.g., the second ring). Further, the user walks toward the parking space (e.g., the vehicle) and crosses the boundary of the outermost ring, wherein the RM platform 109 is tracking the device movement and determines that the user/device is approaching the parking space (e.g., only 100 meters away).

In step 629, the RM platform 109 determines an estimated time from the reentry to an end of accessing of the location-based resource by the one or more contributing devices. In one example, the RM platform 109 has determined that the user has crossed the outermost ring of the geo-fence and therefore, is about 100 meters away from the parking space. Further, the RM platform 109 and/or one or more applications 107 may estimate how long it may take for the user to reach the parking space, access the user vehicle and release/end access of the parking space (e.g., it may take about two minutes for the user to release the parking space.) In another embodiment, the system 100 may determine and/or utilize information associated with an angle of approach of the user while crossing a geo-fence boundary toward the parking space. For example, if the user crosses the second ring with an angle of 30-degree the system 100 may determine/estimate that the user is walking toward the vehicle and the parking space. In another example, if the trace from the outer geo-fence ring to the second ring is not clear (e.g., not sure), then the system 100 may continue tracking the user movement for more information. Further, if an additional trace from the second geo-fence ring to the innermost geo-fence ring is directed toward the parking space, then the system 100 algorithm can estimate a leaving time for the user and a time when the parking space will become available, which may be transmitted to the RM platform 109 and/or one or more other device.

In step 631, the RM platform 109 causes a transmission of a notification regarding the location-based resource based, at least in part, on the estimated time. In one example, the UE 101 may transmit one or more messages indicating availability of the location-based resource (e.g., a parking space) based on one or more information items determined at the UE 101 and/or at the RM platform 109. In another example, the RM platform 109 detects and/or determines the availability of the location-based resource (e.g., a parking space) and transmits one or more notifications to one or more users and/or one or more service providers indicating potential availability parking space.

Figure 7:
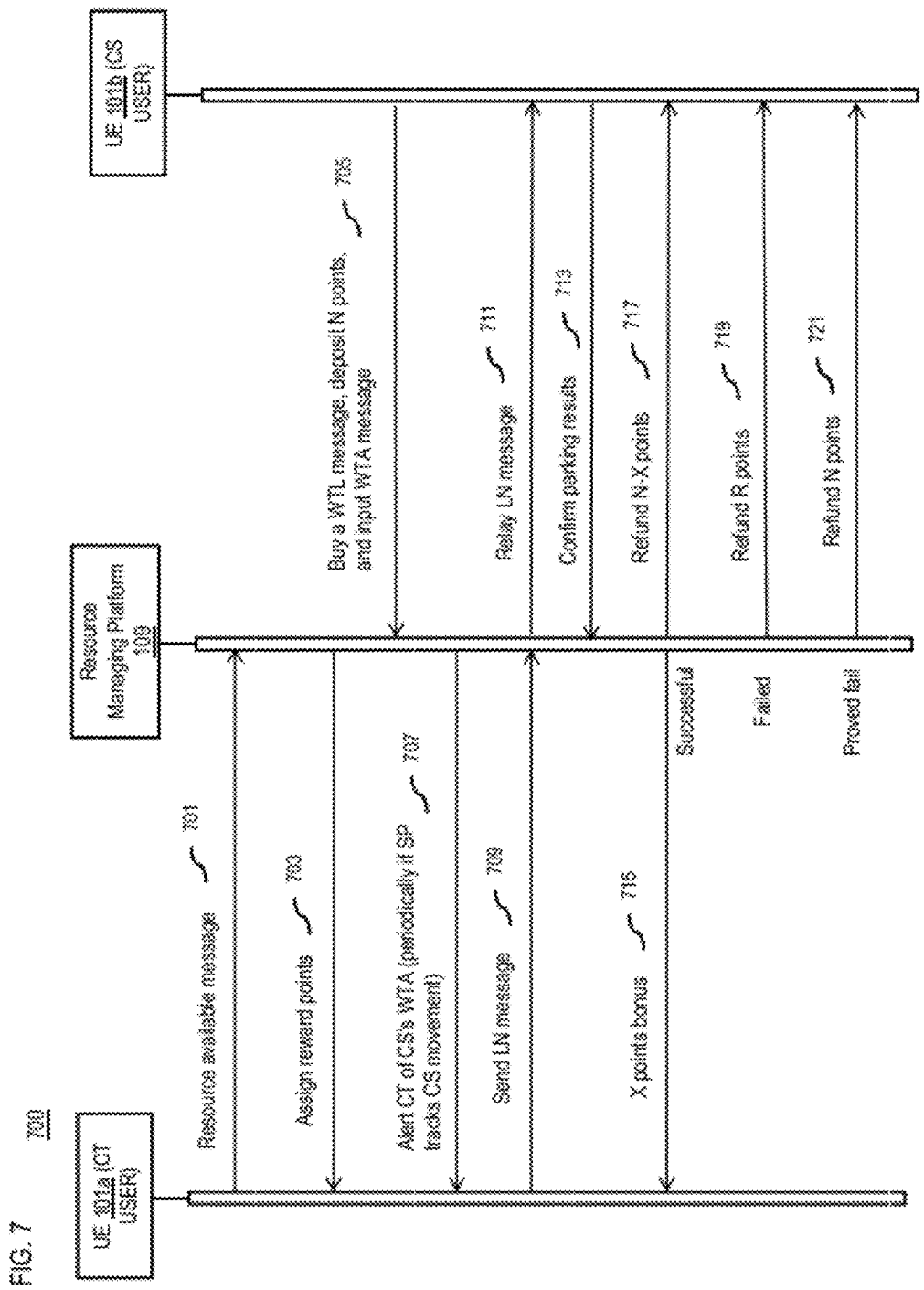
FIG. 7 is a flowchart of a process for sharing and managing resource availability information, according to an embodiment.

FIG. 7 is a time sequence diagram that illustrates a sequence of messages and processes for sharing and managing resource availability information, according to an embodiment. A network process on the network is represented by a thin vertical box. A message passed from one process to another is represented by horizontal arrows. A step performed by a process is indicated by a box or looping arrow overlapping the process at a time sequence indicated by the vertical position of the box or looping arrow.

The processes represented in FIG. 7 are the UE 101*a* corresponding to the CT user, the RM platform 109, and the UE 101*b* corresponding to the CS user.

In the process 701, the CT user via UE 101*a* sends a resource availability message to, at least, the RM platform 109. Once the RM platform 109 receives the message, the RM platform 109 at 703, at least, causes assignment of one or more reward points to the CT user. At 705, the RM platform 109 receives a request from the CS user including information on one or more required resources, time indicating when the resource is required, location information of the required resources and/or one or more other information related to the required resources, and further deposits one or more credit points, for example, to the RM platform 109. Further, the RM platform 109 evaluates one or more resource availability messages and provides one or more resource availability information to the CS user of UE 101*b*. At 707, the RM platform 109 provides to the CT user one or more information related to the CS user, for example, indicating when the CS user will be available to access the available resource. At 709, the CT user sends one or more messages indicating, for example, that the resource is available now. At 711, the RM platform 109 sends one or more messages to the CS user, at least, indicating that the resource is available now. At 713, the CS user sends a message to the RM platform 109 indicating, at least, that the CS user has accessed the resource. At 715, the RM platform 109 assigns one or more credit points to the CT user. At 717 the RM platform 109, at least, causes deduction of one or more points from the one or more credit points deposited by the CS user at 705 and, at least, causes refund of one or more credit points to the CS user. At 719, if the CS user indicates that the one or more resource indicated to be available is not available any longer and that the CS user is not able to access the one or more resources, then the RM platform 109, at least, causes a partial refund, to the CS user, of the credit points deposited by the CS user at 705. However, at 721, if the one or more resources identified as available are confirmed to be unavailable, then the RM platform 109, at least, causes full refund of the credit points back to the CS user.

Figure 8A:
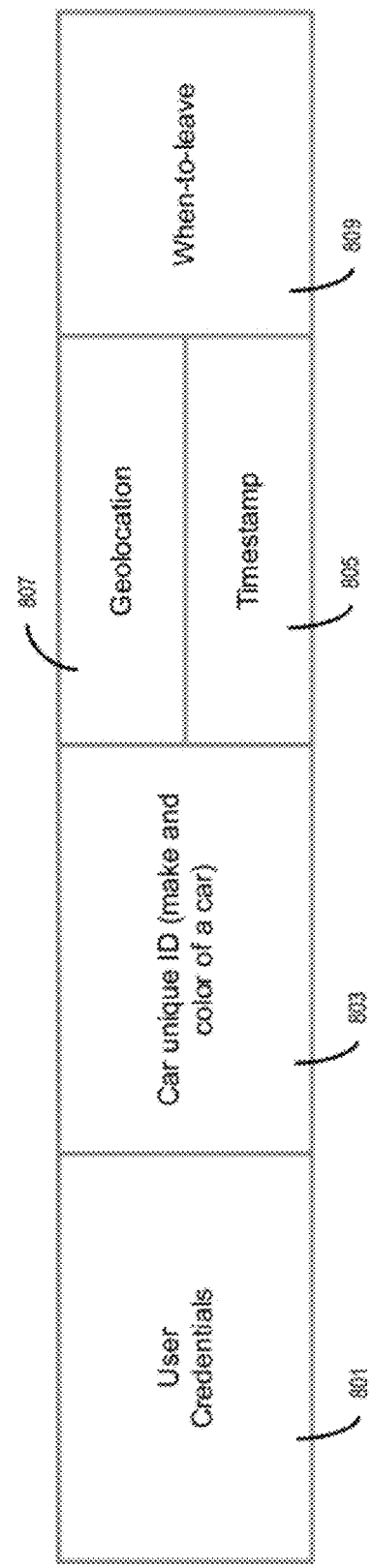
FIGS. 8A-8B are examples of identification information for assisting in identifying location of one or more available resources and/or one or more users, according to various embodiments.
Figure 8B:
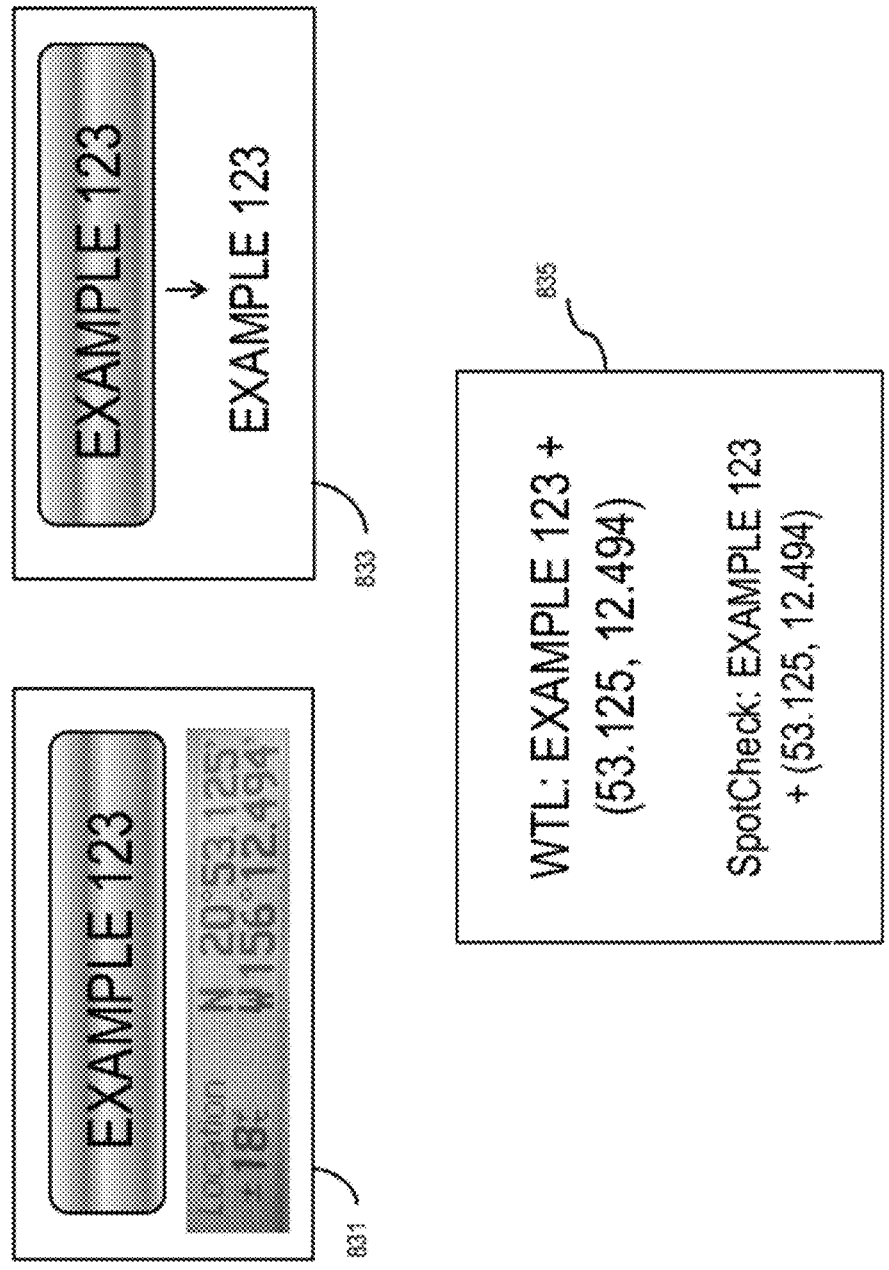

FIGS. 8A-8B are examples of identification information for assisting in identifying location of one or more available resources and/or one or more users, according to various embodiments.

FIG. 8A depicts identification information that can assist in identifying a user, a user device, a user location and the like. In one embodiment, 801 provides user information which can be obtained from user device information, user account information at one or more network sites and the like. In another embodiment, 803 provides information which can assist in identifying a user device and/or resource, for example, a vehicle information such as vehicle's identification number, make, color and/or the like. In one or more embodiments, 805 and 807 depict information provided by a user device via one or more sensors such as GPS location information, time information and/or the like. In another embodiment, 809 user information is provided to, at least, indicate when a CT user will make one or more resources available and/or when a CS user will access and consume the one or more available resources.

FIG. 8B depicts identification information that can assist in identifying location of a user. In one embodiment, 831 depicts a rendering of a vehicle license plate which further contains geographical location information of the vehicle, for example, GPS location information. In another embodiment, 833 depicts a rendering of a vehicle license plate which can also be identified and/or processed, at least in part, by the RM platform 109. In another embodiment, 835 depicts vehicle license plate information and its geographical location which, at least, the RM platform 109 attempts to verify. Moreover, a resource can be identified, for example, by geographical location information, geographical location address, a designating number and the like.

FIGS. 9A-9D are diagrams of user interfaces (UI) utilized in the processes of FIGS. 4-7, according to various embodiments. It is noted that the depicted UI features are examples and that the UIs can be rendered in various forms, shapes, preferences and the like.

Figure 9A:
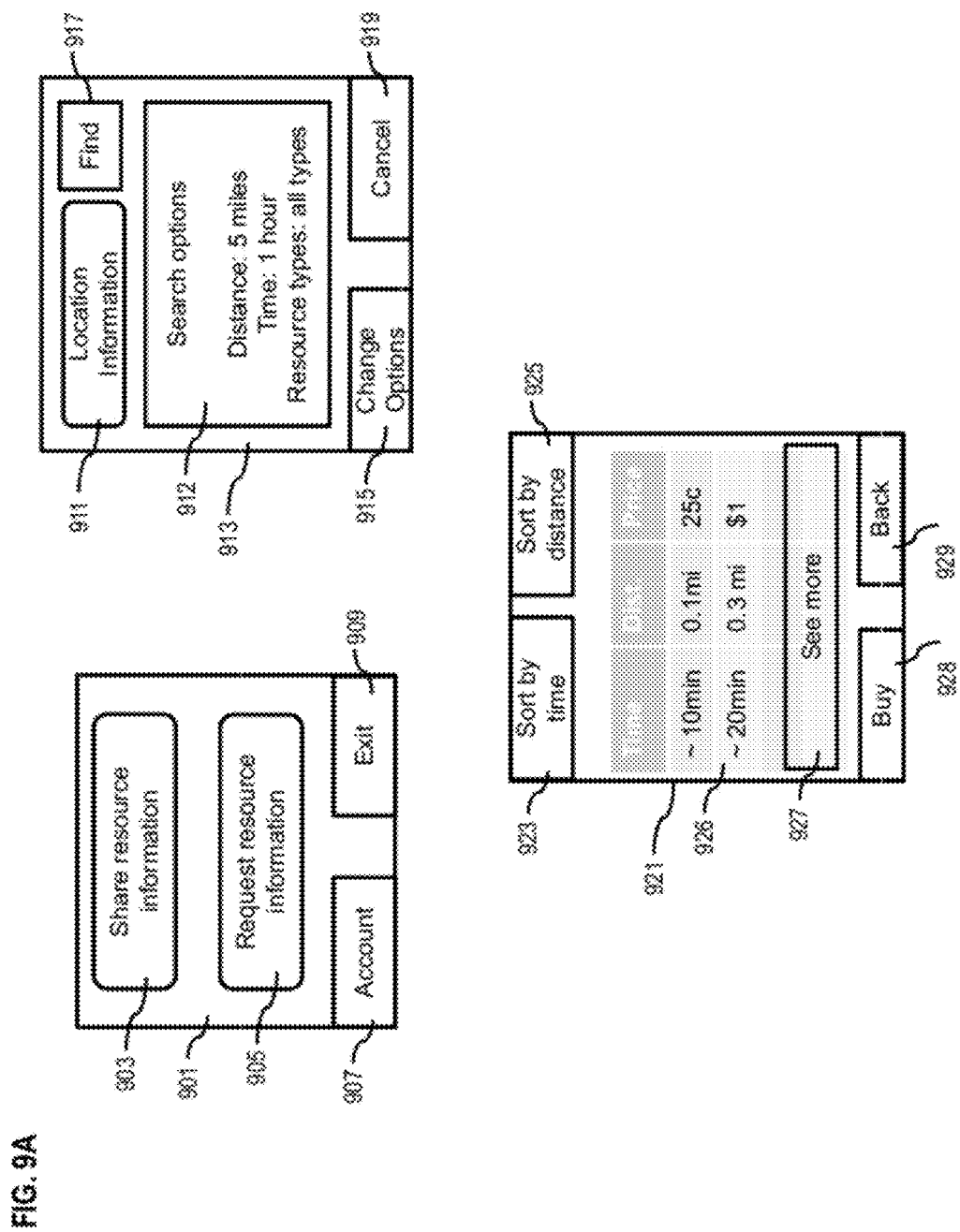

At FIG. 9A, user interface 901 includes an example interface utilized to share, 903, and/or request, 905, one or more resource information. In one embodiment, the CT user can share information on one or more resources which will be available in the near future. In another embodiment, a CS user can request information on one or more resources which the CS user would like to access in the near future. In another embodiment, a user can be a CT user and a CS user substantially at the same time. For example, a user can provide resource availability information (e.g., be a CT user) and can request resource availability information (e.g., be a CS user) substantially at the same time. At user interface 901 user of UE 101 can manage one or more user accounts, for example, at RM platform 109, at service platform 103, at UE 101, at a social network site, and/or the like. At user interface 909 a user can exit the user interface.

Further, user interface 913 includes an example interface to provide additional information, for example, location information. At 912, a CS user can specify one or more search options, for example, a distance to a destination of the CS user, estimated time of arrival at the destination, indicate type of resource required and the like. At 915, the user may change one or more options and at 917 the user (e.g., a CS user) may execute the request. At 919, the user can cancel all or portion of one or more actions via the user interface 912.

Furthermore, user interface 921 is utilized to indicate additional information on one or more available resources. At 923, one or more information can be sorted by time and at 925 the information can be sorted by distance, for example, from a user location to the one or more available resources. At 927, one or more resource information may be presented to the user and at 928 the user can execute the request to receive the resource information, for example, to buy the information. At 929, the user can review (e.g., go back) the one or more resource information and/or user actions.

At FIG. 9B, examples of various user interfaces are utilized to indicate information on one or more available resources. Interface 931 is utilized to indicate additional information on the one or more available resources. Indicator 933 indicates location of the user, for example, on a mapping application and 935 indicates destination location of the user. Indicator 937 indicates the location of the available resource, which the CS user has requested and will attempt to utilize. Additionally, a resource can be identified, for example, by geographical location information, geographical location address, a designating number and the like.

Indicator 939 presents a time when a resource will be available and 941 indicates information for the CS user, for example, a suggested time for the CS user to be near and/or at the location of the resource. Indicators 943 and 945 present one or more options for the CS user to indicate, for example, whether the one or more identified resources were utilized successfully. Furthermore, the user can cause one or more requests, for example, request a refund, via 947, of one or more credits (e.g., monetary credit, gaming credit, social network credit, etc.) and indicate one or more reasons, via 949, for the refund request.

Figure 9C:
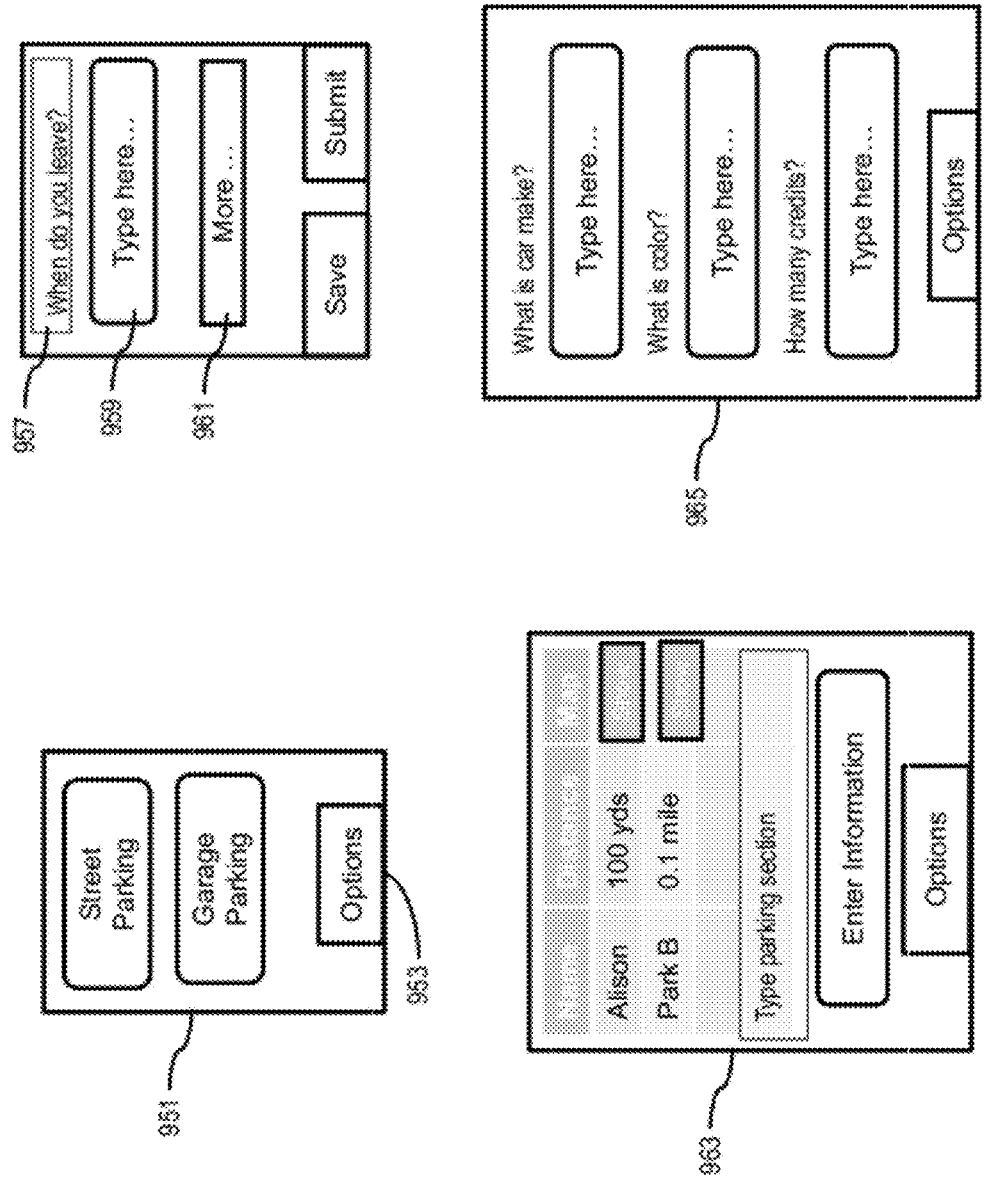

At FIG. 9C, examples of various user interfaces are utilized to indicate information on one or more vehicle parking spaces. User interface 951 is utilized to indicate location information of the parking space, for example, in a parking garage, on a street, in a parking lot, etc. Further, additional information can be indicated via menu options 953, for example, whether the parking space requires a fee, a compact vehicle space, a well-lit space and the like. User interface 957 is utilized to indicate, for example, when the parking space will be available. Indicators 959 and 961 allow a user to submit additional information related to the resource availability, WTL, and the like. User interface 963 indicates further information on the parking space, for example, distance to the parking space, parking section information, and additional options to indicate the information on a mapping application. User interface 957 allows the user to submit additional information, for example, type of vehicle, color of vehicle, credits required to obtain the resource availability information, and the like.

Figure 9D:
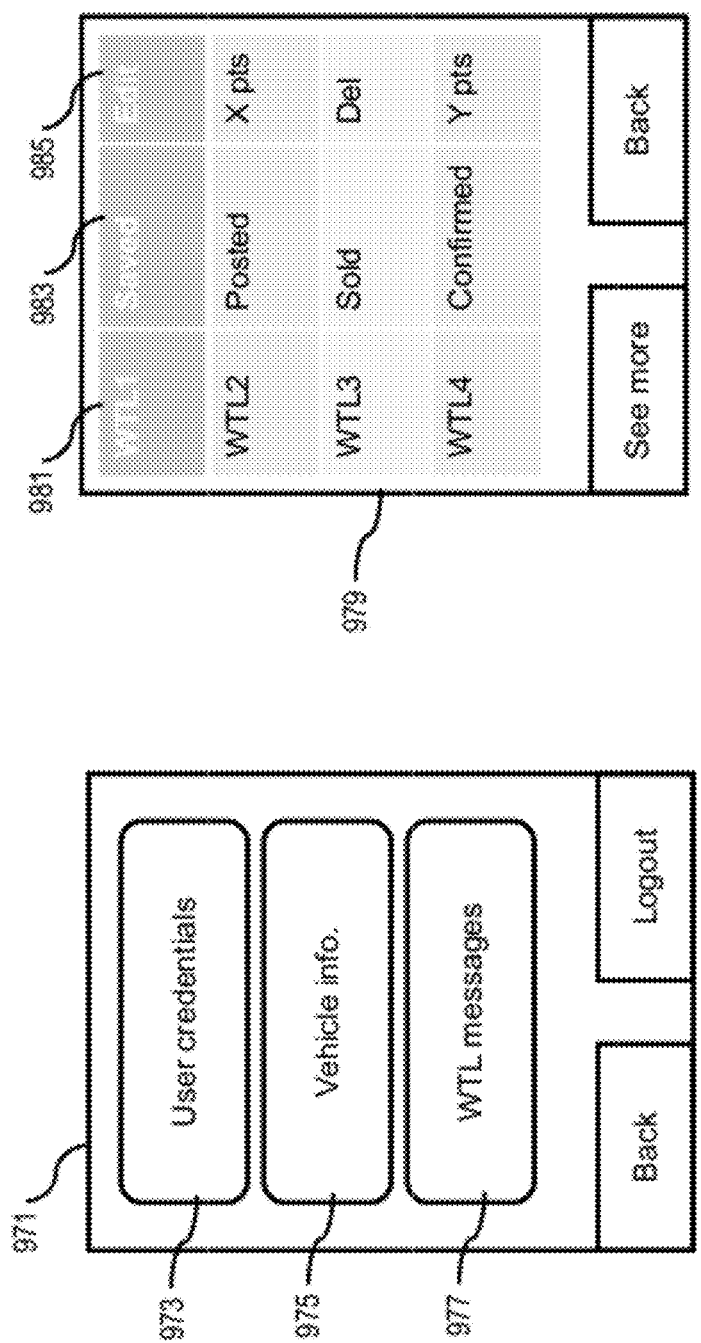

FIG. 9D depicts examples of various user interfaces which are utilized to indicate information on one or more vehicle parking spaces. User interface 971 is utilized to show and/or collect information on the one or more available resources and/or user information. Indicator 973 can indicate user information (e.g., user credentials, user account, etc.) and/or allow the user to modify, update, and change the user information. Indicator 975 can indicate user vehicle information, such as make, color, model, model year and the like. The vehicle can be an automobile, a motorcycle, a watercraft, and the like. Indicator 977 can indicate one or more message related to, for example, an estimated time which the CT user plans to leave the parking space and at which time the parking space would become available. User interface 979 presents further information on one or more CT users' one or more messages, for example, when the one or more CT users plan to leave the one or more parking spots. Indicator 981 shows the one or more "when to leave" CT users' messages (e.g., WTL1, WTL2, WTL3, etc.). Indicator 983, shows a status of the one or more resource availability messages, for example, saved, posted, sold, confirmed and the like. Indicator 985 indicates additional information related to the one or more WTL messages, for example, how many credit points a given WTL requires for obtaining the WTL information as well perform one or more functions, for example, edit, delete and/or the like.

Figure 9F:
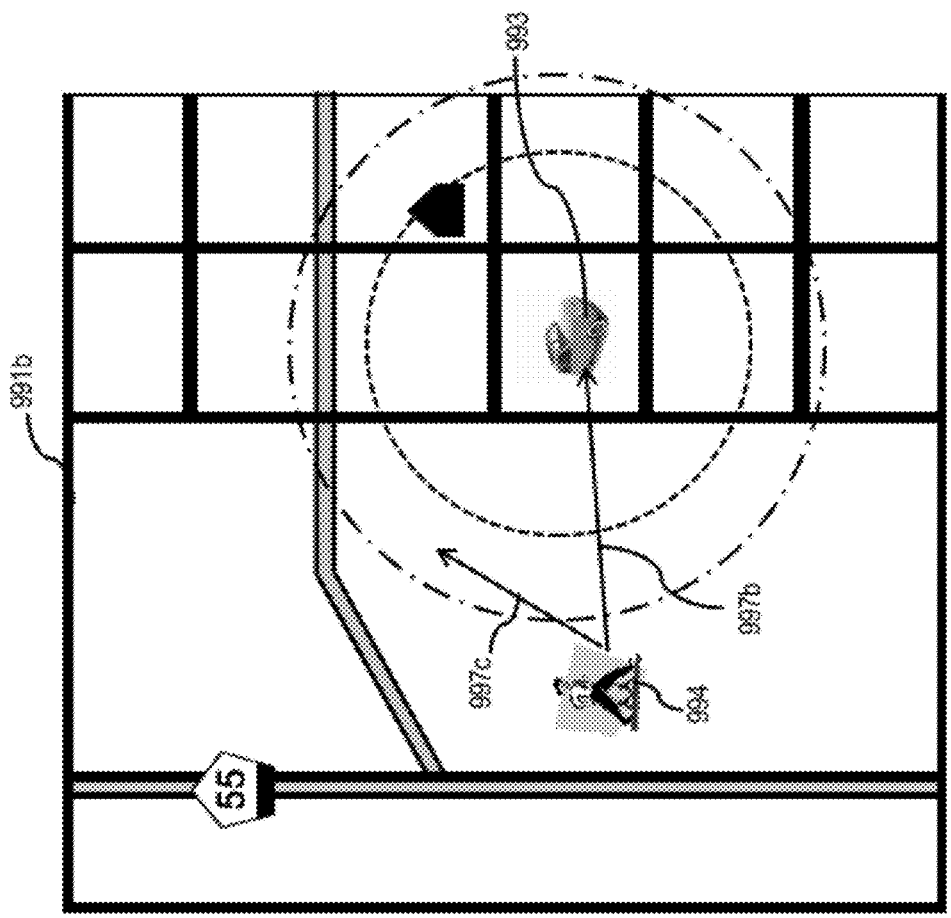

FIGS. 9E and 9F are diagrams depicting a graphical representations of a geo-fence associated with a location-based resource, according to various embodiments.

FIG. 9E shows diagram 991a wherein a user vehicle 993 is at a parking space and user 994 is walking away 997 from the vehicle and the parking space. In one example, the RM platform 109 has determined a geo-fence including two fences (e.g., circular rings) 995 innermost with radius 995R and 996 outermost with radius 996R, wherein the parking space is a center point for the geo-fence set. Further, the innermost fence may have a radius of 50 meters, which may correspond to about one minute of walking for a user to reach and the second fence may have a radius of about 100 meters, which may correspond to about two minutes of walking for a user to reach.

FIG. 9F shows diagram 991b wherein the user vehicle 993 is at a parking space and user 994 is walking toward 997b the vehicle and the parking space. In one example, the RM platform 109 can determine the user movement crossing the outer and inner fences and determine one or more time estimates for the user leaving the parking space. In another example, the user 994 is walking in the direction of 997c, crosses the outer fence, but does not cross the inner fence, wherein the RM platform 109 may continue to trace the movement of the user for further evaluation of movement and activity.

With the above example approaches, a coordinated system to share and manage resource availability information is provided. In this manner, coordination between users to acquire resources and/or resource availability information can be substantially automated and provided in real time. The coordination system allows for the real time access for sharing and managing resource availability information between users interested in sharing and/or acquiring resource availability information. The real time access allows for the users to know when and where one or more resources may be available. Further, the system provides for sharing, managing and coordinating the resource availability information among users.

The processes described herein for sharing and managing resource availability information may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
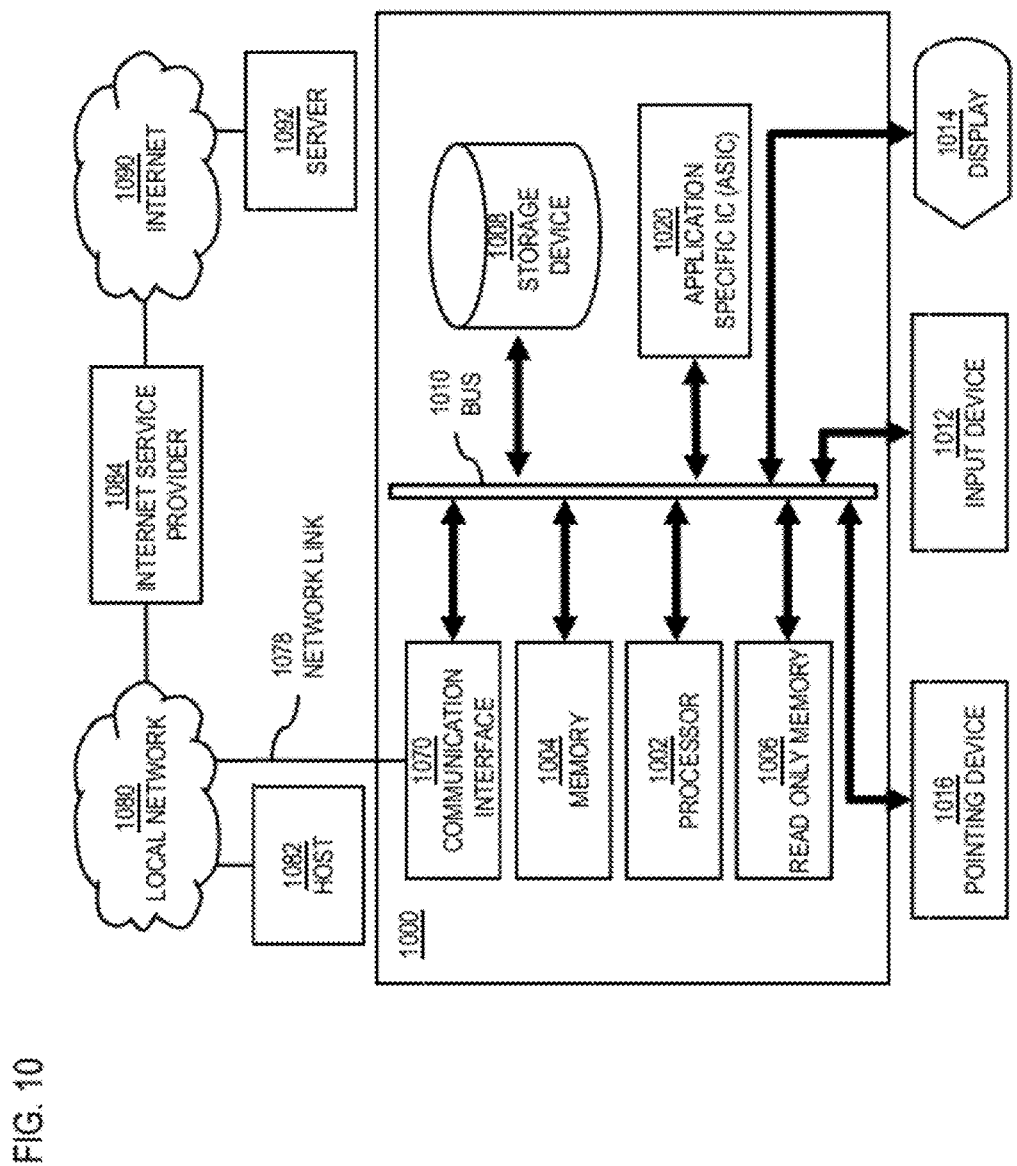
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to share and manage resource availability information as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of sharing and managing resource availability information.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to sharing and managing resource availability information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for sharing and managing resource availability information. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for sharing and managing resource availability information, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for the UE 101, service platform 103, RM platform 109, and resources 113.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
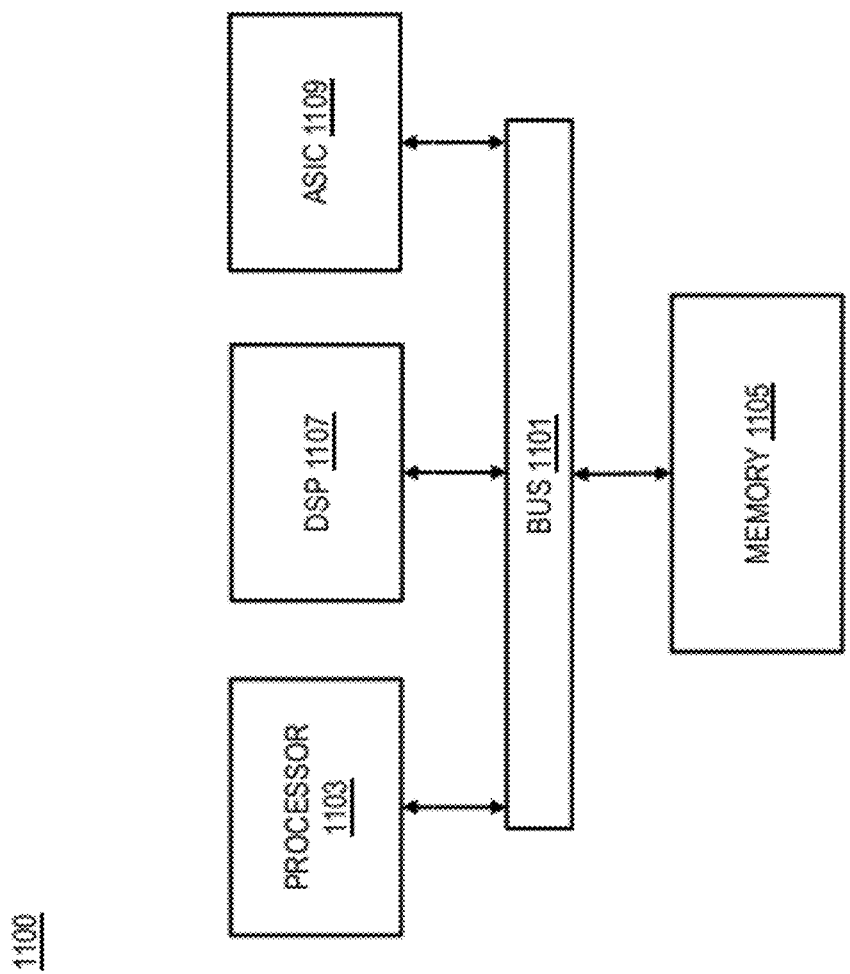
FIG. 11 is a diagram of a chip set that can be used to implement an embodiment of the invention.

FIG. 11 illustrates a chip set 1100 upon which an embodiment of the invention may be implemented. Chip set 1100 is programmed to share and manage resource availability information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps for sharing and managing resource availability information.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to share and manage resource availability information. The memory 1105 also stores the data associated with or generated by the execution of the inventive steps.

Figure 12:
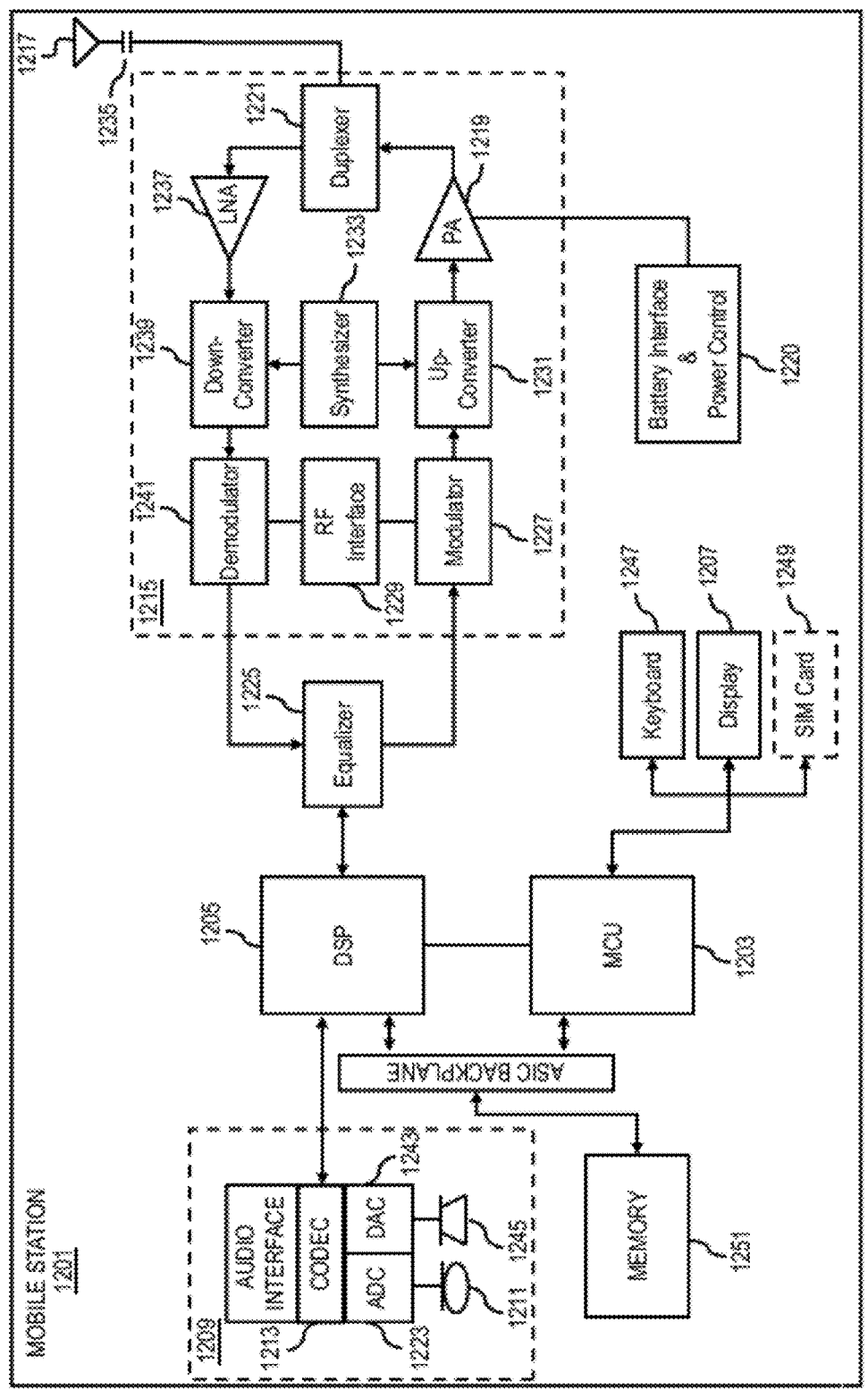
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1200, or a portion thereof, constitutes a means for performing one or more steps of sharing and managing resource availability information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of sharing and managing resource availability information. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to share and manage resource availability information. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal; the (1) data and/or (2) the information and/or (3) the at least one signal based at least in part on the following:
   one or more resource availability messages from one or more contributing devices;

one or more requests to access the one or more resource availability messages from at least one consuming device;
at least one determination to reserve access to the one or more resource availability messages based, at least in part, on the one or more requests;
at least one determination of progress information that indicates, at least in part, an estimated time when the at least one consuming device will access at least one resource based on the one or more resource availability messages, an estimated time when the contributing device will make the at least one resource available, or a combination thereof;
one or more resource consumption messages from the at least one consuming device, wherein the one or more resource consumption messages include, at least in part, information regarding when the at least one consuming device intends to access the at least one resource referenced in the one or more resource availability messages, wherein the at least one resource referenced in the one or more resource availability messages includes, at least in part, a location-based resource;
a processing of one or more sensor information associated with the one or more contributing devices to determine one or more locations associated with the location-based resource; and
a determination of at least one geo-fence encompassing the one or more locations,
wherein the one or more resource availability messages are initiated based, at least in part, on a monitoring of location information associated with the one or more contributing devices with respect to the at least one geo-fence.

2. The method of claim 1, wherein the (1) data and/or (2) the information and/or (3) the at least one signal are further based at least in part on the following:
at least one determination to cause at least in part a transmission of the one or more resource availability messages to the at least one consuming device based, at least in part, on a reserved access.

3. The method of claim 1, wherein the (1) data and/or (2) the information and/or (3) the at least one signal are further based at least in part on the following:
at least one determination to award or to deduct one or more points, one or more credits, monetary value, or a combination thereof to the at least one contributing device, the at least one consuming device, or a combination thereof based, at least in part, on the one or more resource availability messages, the request, the reserved access, a status of accessing at least one resource referenced in the one or more resource availability messages, or a combination thereof.

4. The method of claim wherein the (1) data and/or (2) the information and/or (3) the at least one signal are further based at least in part on the following:
a processing of the one or more sensor information to determine one or more activity states,
one or more transitions between the one or more activity states, or a combination thereof, wherein the determination of the one or more locations, the at least one geo-fence, or a
combination thereof is further based, at least in part, on the one or more activity states.

5. The method of claim 1, wherein the (1) data and/or (2) the information and/or (3) the at least one signal are further based at least in part on the following:
a processing of the sensor information to determine a reentry of the one or more contributing devices within the at least one geo-fence; and
a determination of an estimated time from the reentry to an end of accessing of the location-based resource by the one or more contributing devices.

6. The method of claim 5, wherein the (1) data and/or (2) the information and/or (3) the at least one signal are further based at least in part on the following;
determine to transmit the one or more resource availability messages to the at least one consuming device based, at least in part, on the reserved access.

7. The method of claim 1, wherein the progress information indicates, at least in part, progress made by the at least one consuming device towards accessing the at least one resource available.

8. The method of claim 1, wherein the estimated time when the at least one consuming device will access the at least one resource, the estimated time when the contributing device will make the at least one resource available, or a combination thereof is determined based on a determined location of a user with respect to the at least one resource.

9. The method of claim 8, wherein the location of the user is determined by monitoring user movement with respect to a geo-fence.

10. The method of claim 9, wherein the location of the user is determined by monitoring user movement with respect to a plurality of geo-fences.

11. The method of claim 1, wherein the at least one determination of progress information indicates an estimated time when the contributing device will make the at least one resource available.

12. An apparatus comprising: at least one processor; and
at least one memory including computer program code for one or more programs, the at least one memory and the computer program code configured to, with the at least one processor, cause the apparatus to perform at least the following, receive one or more resource availability messages from one or more contributing devices;
receive one or more requests to access the one or more resource availability messages from at least one consuming device;
determine to reserve access to the one or more resource availability messages based, at least in part, on the one or more requests;
determine progress information that indicates, at least in part, an estimated time when the at least one consuming device will access at least one resource based on the one or more resource availability messages, an estimated time when the contributing device will make the at least one resource available, or a combination thereof, and receive one or more resource consumption messages from the at least one consuming device,
wherein the one or more resource consumption messages include, at least in part, information regarding when the at least one consuming device intends to access at least one resource referenced in the one or more resource availability messages, wherein the at least one resource referenced in the one or more resource availability messages includes, at least in part, a location-based resource;
process and/or facilitate a processing of one or more sensor information associated with the one or more contributing devices to determine one or more locations associated with the location-based resource; and
determine at least one geo-fence encompassing the one or more locations, wherein the one or more resource availability messages are initiated based, at least in part, on a monitoring of location information associated with the one or more contributing devices with respect to the at least one geo-fence.

13. The apparatus of claim 12, wherein the apparatus is further caused, at least in part, to:
    determine to transmit the one or more resource availability messages to the at least one consuming device based, at least in part, on a reserved access.

14. The apparatus of claim 12, wherein the apparatus is further caused, at least in part, to:
    determine to award or to deduct one or more points, one or more credits, monetary value, or a combination thereof to the at least one contributing device, the at least one consuming device, or a combination thereof based, at least in part, on the one or more resource availability messages, the request, the reserved access, a status of accessing at least one resource referenced in the one or more resource availability messages, or a combination thereof.

15. The apparatus of claim 12, wherein the apparatus is further caused to:
    process and/or facilitate a processing of the one or more sensor information to determine one or more activity states, one or more transitions between the one or more activity states, or a combination thereof,
    wherein the determination of the one or more locations, the at least one geo-fence, or a combination thereof is further based, at least in part, on the one or more activity states.

16. The apparatus of claim 12, wherein the apparatus is further caused to: process and/or facilitate a processing of the sensor information to determine a reentry of the one or more contributing devices within the at least one geo-fence; and
    determine of an estimated time from the reentry to an end of accessing of the location-based resource by the one or more contributing devices.

17. The apparatus of claim 16, wherein the apparatus is further caused to: cause, at least in part, a transmission of a notification regarding the location-based resource based, at least in part, on the estimated time.

18. The apparatus of claim 12, wherein the progress information indicates, at least in part, progress made by the at least one consuming device towards accessing the at least one resource available.

19. The apparatus of claim 12, wherein the at least one determination of progress information indicates an estimated time when the contributing device will make the at least one resource available.

* * * * *